(12) United States Patent
Goel et al.

(10) Patent No.: US 9,082,204 B2
(45) Date of Patent: Jul. 14, 2015

(54) STORAGE STRUCTURES FOR STITCHING PRIMITIVES IN GRAPHICS PROCESSING

(75) Inventors: Vineet Goel, Winter Park, FL (US); Jian Mao, San Diego, CA (US); Nariman Moezzi Madani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 13/599,747

(22) Filed: Aug. 30, 2012

(65) Prior Publication Data
US 2014/0063014 A1    Mar. 6, 2014

(51) Int. Cl.
*G06T 17/20* (2006.01)
*G06T 1/60* (2006.01)

(52) U.S. Cl.
CPC .. *G06T 1/60* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 5,488,684 A | 1/1996 | Gharachorloo et al. | |
| 6,028,607 A | 2/2000 | Chan | |
| 6,211,883 B1 | 4/2001 | Goel | |
| 6,438,266 B1 | 8/2002 | Bajaj et al. | |
| 6,445,389 B1 | 9/2002 | Bossen et al. | |
| 6,462,738 B1 | 10/2002 | Kato | |
| 6,597,356 B1 | 7/2003 | Moreton et al. | |
| 6,600,488 B1 | 7/2003 | Moreton et al. | |
| 6,747,644 B1 * | 6/2004 | Deering | 345/420 |
| 6,906,716 B2 | 6/2005 | Moreton et al. | |
| 6,940,505 B1 | 9/2005 | Savine et al. | |
| 7,423,644 B2 | 9/2008 | Goel et al. | |
| 8,120,607 B1 | 2/2012 | Legakis et al. | |
| 8,599,202 B1 | 12/2013 | Legakis et al. | |
| 2008/0024491 A1 | 1/2008 | Sathe et al. | |
| 2009/0237401 A1 | 9/2009 | Wei et al. | |
| 2010/0164955 A1 | 7/2010 | Sathe et al. | |
| 2010/0214294 A1 | 8/2010 | Li et al. | |
| 2011/0057931 A1 | 3/2011 | Goel et al. | |
| 2011/0063294 A1 | 3/2011 | Brown et al. | |
| 2011/0128285 A1 | 6/2011 | Gong | |
| 2011/0267346 A1 | 11/2011 | Howson | |
| 2011/0310102 A1 | 12/2011 | Chang | |
| 2014/0063012 A1 | 3/2014 | Madani et al. | |
| 2014/0063013 A1 | 3/2014 | Goel et al. | |

OTHER PUBLICATIONS

Chhugani et al., "Geometry Engine Optimization: Cache Friendly Compressed Representation of Geometry", Proceedings I3D 2007, Apr. 30-May 2, 2007, 8 pp. XP040058183.

(Continued)

*Primary Examiner* — Daniel Hajnik
(74) *Attorney, Agent, or Firm* — Shumaker & Sieffert, P.A.

(57) ABSTRACT

Techniques described in the disclosure are generally related to generating points of a domain. A tessellation unit may determine outer ring point coordinates for a point of an outer ring of the domain, and inner ring point coordinates for a point of an inner ring of the domain. The inner ring is inner to the outer ring within the domain. The tessellation unit may enqueue the inner ring point coordinates at a location of a queue, read the inner ring point coordinates from the queue, and read the outer ring point coordinates from the queue when the outer ring is not an outermost ring, where the outer ring point coordinates were previously enqueued in the queue when the outer ring was a previous inner ring. The tessellation unit may connect the inner ring coordinates and the outer ring coordinates each of which being read from the queue.

40 Claims, 8 Drawing Sheets

(56) References Cited

OTHER PUBLICATIONS

Choi et al., "Adaptive Tessellation of PN Triangles Using Minimum-Artifact Edge Linking," IEICE Transactions on Fundamentals of Electronics, Communications and Computer Sciences, Engineering Sciences Society, vol. E87-A, No. 10, Oct. 2004, 8 pp. XP001210488, ISSN: 0916-8508.

Espino et al., "Hardware support for adaptive tessellation of Bezier surfaces based on local tests", Journal of Systems Architecture, vol. 53, No. 4, Apr. 2007, 18 pp. XP005891873, ISSN: 1383-7621.

Hoppe, "Optimization of Mesh Locality for Transparent Vertex Caching", Computer Graphics Proceedings, Annual Conference Series, SIGGRAPH 99, Aug. 8-13, 1999, 8 pp., XP000981469.

International Search Report and Written Opinion—PCT/US2013/055369—ISA/EPO—Mar. 7, 2014, 19 pp.

Livny et al., "Seamless patches for GPU-based terrain rendering," The Visual Computer; International Journal of Computer Graphics, vol. 25, No. 3, Mar. 11, 2008, 12 pp. XP019711678, ISSN: 1432-2315.

Moreton, "Watertight Tessellation using Forward Differencing", HWWS 01 Proceedings of the ACM SIGGRAPH/Eurographics workshop on Graphics hardware, 2001, 8 pp. XP055056554.

Ni et al., "Efficient substitutes for subdivision surfaces", ACM SIGGRAPH 2009 Course Notes, Aug. 5, 2009, 107 pp. XP055084843.

Taubin et al., "Geometric Compression through Topological Surgery," MPEG Meeting; San Jose; (Motion Picture Expert Group or ISO/IEC JTC1/SC29/WG11), No. M3059, Feb. 1997, 16 pp. XP030032332, ISSN: 0000-0315.

Yang et al., CAD data visualization on mobile devices using sequential constrained Delaunay triangulation, Computer Aided Design, Elsevier Publishers, vol. 41, No. 5, May 2009, 10 pp. XP026096451, ISSN: 0010-4485.

Gee, "Introduction to the Direct3d 11 Graphics Pipeline," 2008 NVIDIA Corporation, Aug. 2008, The World of Visual Computing, pp. 1-55.

"Microsoft Tessellation Overview," Windows Dev Center—Desktop, retrieved Feb. 22, 2012, pp. 1-6.

Naty, "Direct3d11 Details Part II: Tessellation," Real-Time Rendering, Aug. 2, 2008, pp. 1-3.

U.S. Appl. No. 13/599,218, by Nariman Moezzi Madani, filed Aug. 30, 2012.

U.S. Appl. No. 13/599,645, by Vineet Goel, filed Aug. 30, 2012.

Bill Bilodeau, "Report Information from ProQuest-Decal Tessellation," Feb. 19, 2012, 11 pp.

Second Written Opinion from corresponding PCT Application Serial No. PCT/US2013/055369 dated Aug. 7, 2014 (13 pages).

Luo X., et al., "Key Technology Research on Data Conversion between B-Rep Based CAD and VR Model", Measuring Technology and Mechatronics Automation, 2009, ICMTMA '09, International Conference on, IEEE, Piscataway, NJ, USA, Apr. 11, 2009, pp. 104-107, XP031511401, ISBN: 978-0-7695-3583-8.

International Preliminary Report on Patentability from U.S. Patent Application PCT/US2013/055369, dated Dec. 12, 2014, 16 pp.

Second Written Opinion from International Application No. PCT/US2013/055369, dated Aug. 7, 2014, 13 pp.

\* cited by examiner

STORAGE STRUCTURES FOR STITCHING PRIMITIVES IN GRAPHICS PROCESSING

TECHNICAL FIELD

This disclosure relates to stitching of for primitives in graphics processing, and more particularly, to stitching with tessellation.

BACKGROUND

A graphics processing unit (GPU) may implement a graphics processing pipeline that includes a tessellation stage. The tessellation stage converts a surface into a plurality of primitives on the GPU, resulting in a more detailed surface. For example, the GPU can receive information for a coarse surface, and generate a high resolution surface, rather than receiving information for the high resolution surface. Receiving information for the high resolution surface, rather than the coarse surface, may be bandwidth inefficient because the amount of information needed to define the high resolution surface may be much greater than the amount of information needed to define coarse resolution surface.

SUMMARY

In general, the techniques described in this disclosure are direct to storing points of a domain that reside along an inner ring and an outer ring of the domain, in one or more queues, during stitching of a primitive formed by the stored points. A tessellation unit may generate the points, which may comprise coordinates in the domain, along the outer and inner rings and may store the points in storage structures, such as queues. The tessellation unit may remove the points stored in the queues and stitch the points together. In some examples, the storage structures may allow for the reuse of the points in subsequent stitching iterations without necessarily determining the points needed in the subsequent stitching iterations.

In one example, the disclosure describes a method of generating points of a domain that includes determining, with the tessellation unit, outer ring point coordinates for a point of an outer ring of the domain, determining, with the tessellation unit, inner ring point coordinates for a point of an inner ring of the domain, wherein the inner ring is inner to the outer ring within the domain enqueueing, with the tessellation unit, the inner ring point coordinates at a location of a queue, reading, with the tessellation unit, the inner ring point coordinates from the queue, reading, with the tessellation unit, the outer ring point coordinates from the queue when the outer ring is not an outermost ring, wherein the outer ring point coordinates were previously enqueued in the queue when the outer ring was a previous inner ring, and connecting, with the tessellation unit, the inner ring coordinates and the outer ring coordinates each of which being read from the queue.

In another example, a method of generating point for a domain includes determining, with the tessellation unit, outer ring point coordinates for a point of an outer ring of the domain, determining, with the tessellation unit, inner ring point coordinates for a point of an inner ring of the domain, wherein the inner ring is inner to the outer ring within the domain, enqueueing, with the point generator, the inner ring point coordinates at a first location of a first queue, enqueueing, with the tessellation unit, the outer ring point coordinates in a second location of the first queue when the outer ring is not the outermost ring and when a number of points along the outermost ring is less than or equal to a threshold, enqueueing, with the tessellation unit, the outer ring point coordinates in a first location of a second queue when the outer ring is the outermost ring or when the number of points along the outermost ring is greater than a threshold, reading, with the tessellation unit, the inner ring point coordinates from the first location of the first queue, reading, with the tessellation unit, the outer ring point coordinates from the second location of the first queue when the outer ring is not the outermost ring and when the number of points along the outermost ring is less than or equal to the threshold, reading, with the tessellation unit, the outer ring point coordinates from the first location of the second queue when the outer ring is the outermost ring or when the number of points along the outermost edge is greater than the threshold, and connecting, with the tessellation unit, the inner ring point coordinates and the outer ring point coordinates.

In another example, the disclosure describes a tessellation unit that includes a point generator configured to: determine first outer ring point coordinates for a first point of an outer ring of the domain, determine first inner ring point coordinates for a first point of an inner ring of the domain, wherein the inner ring is inner to the outer ring within the domain, enqueue the first inner ring point coordinates at a first location of a queue, and a connectivity generator configured to: read the first inner ring point coordinates from the queue, read the first outer ring point coordinates from the queue when the outer ring is not an outermost ring, wherein the first outer ring point coordinates were previously enqueued in the queue when the outer ring was a previous inner ring, and connect the first inner ring coordinates and the first outer ring coordinates each of which being read from the queue.

In another example, the disclosure describes a tessellation unit that includes means for determining first outer ring point coordinates for a first point of an outer ring of the domain, means for determining first inner ring point coordinates for a first point of an inner ring of the domain, wherein the inner ring is inner to the outer ring within the domain, means for enqueueing the first inner ring point coordinates at a first location of a queue, and means for reading the first inner ring point coordinates from the queue, means for reading the first outer ring point coordinates from the queue when the outer ring is not an outermost ring, wherein the first outer ring point coordinates were previously enqueued in the queue when the outer ring was a previous inner ring, and means for connecting the first inner ring coordinates and the first outer ring coordinates each of which being read from the queue.

In another example, the disclosure describes a device that includes a queue and a tessellation unit configured to determine first outer ring point coordinates for a first point of an outer ring of the domain, determine first inner ring point coordinates for a first point of an inner ring of the domain, wherein the inner ring is inner to the outer ring within the domain, enqueue the first inner ring point coordinates at a first location of a queue, read the first inner ring point coordinates from the queue, read the first outer ring point coordinates from the queue when the outer ring is not an outermost ring, wherein the first outer ring point coordinates were previously enqueued in the queue when the outer ring was a previous inner ring, and connect the first inner ring coordinates and the first outer ring coordinates each of which being read from the queue.

In another example, the disclosure describes a computer-readable storage medium. The computer-readable storage medium having stored thereon instructions that upon execution cause one or more processors to determine first outer ring point coordinates for a first point of an outer ring of the domain, determine first inner ring point coordinates for a first point of an inner ring of the domain, wherein the inner ring is inner to the outer ring within the domain, enqueue the first inner ring point coordinates at a first location of a queue, read the first inner ring point coordinates from the queue, read the first outer ring point coordinates from the queue when the outer ring is not an outermost ring, wherein the first outer ring point coordinates were previously enqueued in the queue when the outer ring was a previous inner ring, and connect the first inner ring point coordinates and the first outer ring coordinates each of which being read from the queue.

The details of one or more examples are set forth in the accompanying drawings and the description below. Other features, objects, and advantages will be apparent from the description and drawings, and from the claims.

DETAILED DESCRIPTION

Figure 1:
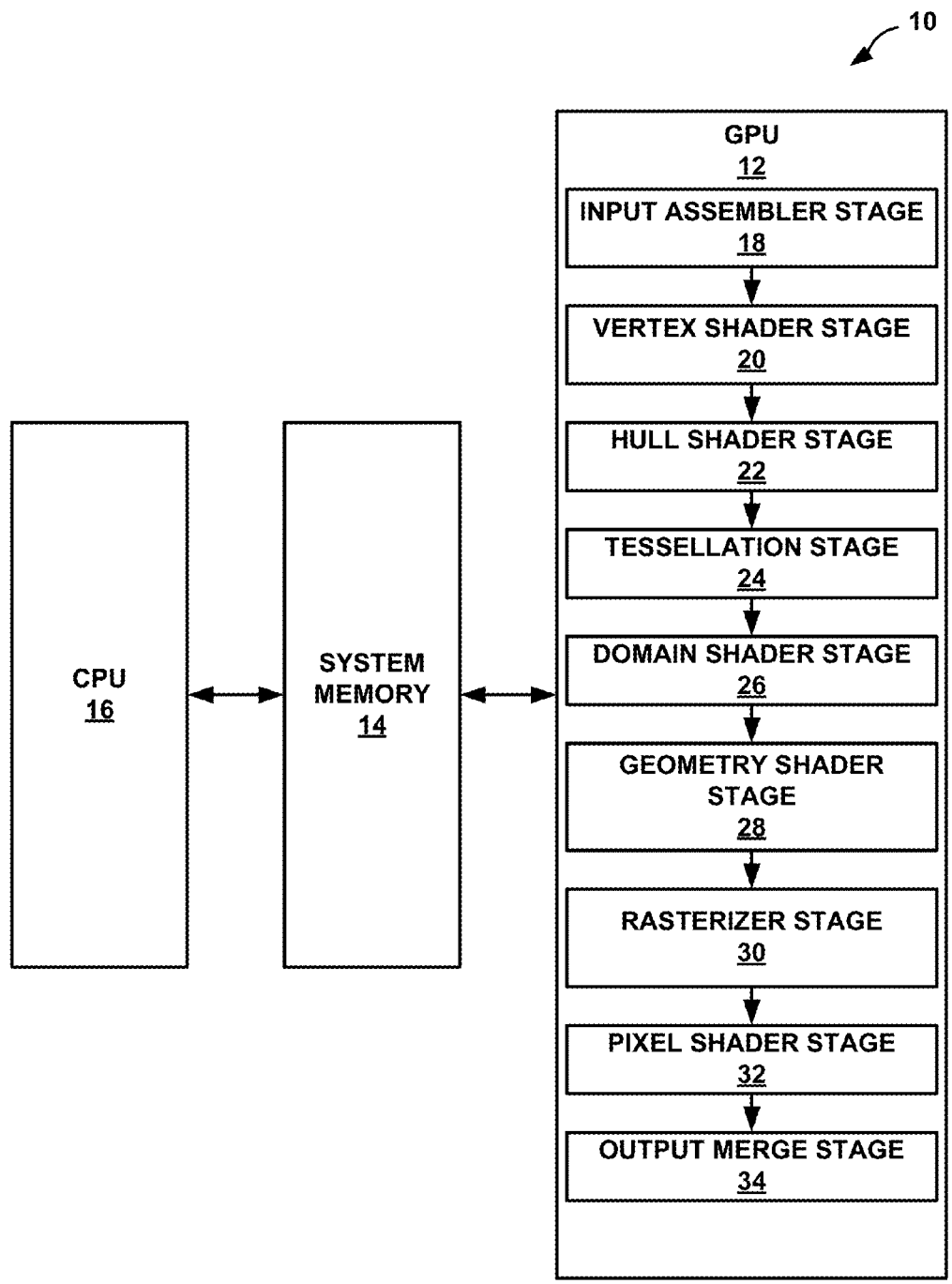
FIG. 1 is a block diagram illustrating an example of a graphics processing unit (GPU) that may implement an example of a graphics processing pipeline in accordance with one or more examples described in this disclosure.

Modern mobile devices, such as laptop computer, tablet computers, smartphones, and digital media players, may include a CPU (Central Processing Unit), a graphics processing unit (GPU) and system memory. When rendering graphics as part of executing an application, the CPU transmits instructions and graphics data to the GPU. In some examples, the graphics data may be in the form of vertices, which may comprise one or more data structures that describes a point in 2D or 3D space.

The application executing on the CPU may communicate with the GPU in accordance with an application programming interface (API). For instance, the application may communicate with the GPU in accordance with the DirectX® API developed by Microsoft® or the OpenGL® API developed by the Khronos Group, as two examples. For purposes of illustration and to ease with understanding, the techniques described in this disclosure are generally described in the context of the DirectX and OpenGL APIs. However, aspects of this disclosure should not be considered limited to the DirectX and OpenGL APIs, and the techniques described in this disclosure may be extended to other APIs as well.

DirectX and OpenGL each define graphics processing pipelines that are to be implemented by a GPU. These graphics processing pipelines may include a combination of programmable stages, as well as fixed-function stages. Some recent versions of the APIs, such as the Direct3D 11 API and the OpenGL 4.x API, include a tessellation process that is to be performed by the GPU.

The tessellation process refers to dividing a portion (referred to as patch) of a surface of an object into a plurality of smaller portions, and interconnecting the smaller portions together. This results in a more highly detailed surface, as compared to the surface prior to tessellation. Tessellation allows the application executing on the CPU to define the surface with low resolution, which may require few points, and allows the GPU to generate a higher resolution surface.

With tessellation, computation efficiency may be realized because the application executing on the CPU may not need to generate the higher resolution surface, and may instead offload the generation the higher resolution surface to the GPU. Furthermore, bandwidth efficiency may also be realized because the CPU may need to transmit information for fewer points of the surface because the low resolution surface includes fewer points as compared to the higher resolution surface, and the GPU may need to retrieve fewer points of the surface.

As described above, the GPU applies the tessellation process to a patch. A patch may be considered as a specialized type of a primitive. A patch is defined by one or more control points that together form a portion of a surface. For example, an object, such as a sphere, may be divided into a plurality of surfaces. In this example, the surfaces may be curved surfaces that, when combined, form the sphere. Each one of the surfaces may be divided into one or more patches, where each of the patches is defined by one or more control points.

The control points may be defined by coordinates (e.g., x and y coordinates for two-dimensional patches or x, y, and z coordinates for three-dimensional patches), and the control points may be considered as vertices of the patch. There may be any number of control points in a patch. For instance, in some examples, the number of control points in a patch may be between one control point up to 32 control points. The number of control points in a patch may be fixed or user defined.

Unlike other primitive types, the control points within the patches may be connected to one another in any way. In other words, there is no predefined way in which the control points of the patches are connected. For example, a standard triangle primitive includes three vertices, and the primitive is defined with a specific way in which the three vertices are connected with one another to form the triangle. The control points, on the other hand, may not need to be connected in any specific way to form a shape. Rather, as one example, some control points in a patch may be connected with one another to form a triangle, other control points in the same patch may be connected with one another to form a rectangle, and yet other control points in the same patch may be connected with one another to form an octagon. As another example, it may be possible that the control points are connected with another to form the same type of shapes as well (e.g., connected to only form a plurality of triangles).

The control points that define a patch of a surface may define a low resolution surface. With the tessellation process, additional detail is added to create a higher resolution surface. For example, referring back to the example of the sphere. If only the control points were used to form the sphere, the sphere would appear jaggy with stair step like points, rather than a smooth curved surface. After tessellation, additional points are added such that when these points are connected, the sphere appears as if it is a smooth sphere.

The tessellation process, in accordance with the both the DirectX API and the OpenGL 4.x API, includes two shaders and a fixed-function unit. A shader is a software application that executes on a programmable shader core of the GPU, and provides substantial functional flexibility. The fixed-function unit is a hardwired logic unit that performs fixed functions, and may not provide functional flexibility. However, it may be possible to implement the functions of the fixed-function unit using a programmable shader coder to provide additional functional flexibility. Solely for purposes of illustration, the functions described in this disclosure for the fixed-function unit are described with a fixed-function unit that provides limited functional flexibility.

In the DirectX API, a graphics processing pipeline that is configured to implement the tessellation process includes a hull-shader stage coupled to a tessellation stage, which is coupled to a domain-shader stage. The hull-shader stage and the domain-shader stage in the DirectX API may form the two shaders of the tessellation process, and the tessellation stage may form the fixed-function unit of the tessellation process. The other stages in the graphics processing pipeline are similar to those in DirectX APIs that do not implement the tessellation process.

In the OpenGL 4.x API, a graphics processing pipeline that is configured to implement the tessellation process includes a tessellation control shader coupled to a primitive generator, which is coupled to a tessellation evaluation shader. The tessellation control shader and the tessellation evaluation shader in OpenGL 4.x may form the two shaders of the tessellation process, and the primitive generator may form the fixed-function unit of the tessellation process. The other stages in the graphics processing pipeline may be similar to those in OpenGL APIs that do not implement the tessellation process.

The techniques described in this disclosure are related generally to the fixed-function unit of the tessellation process (e.g., the tessellation stage of the DirectX graphics processing pipeline and the primitive generator of the OpenGL 4.x graphics processing pipeline). For purposes of brevity, the fixed-function unit of the tessellation process is referred to as a tessellation unit. For instance, examples of the tessellation unit include the tessellation stage of the DirectX graphics processing pipeline, the primitive generator of the OpenGL 4.x graphics processing pipeline, or any other analogous unit for other types of graphics processing pipelines.

As described in more detail, the shader preceding the tessellation unit (e.g., the hull shader stage in DirectX or the tessellation control shader in OpenGL 4.x) transmits values to the tessellation unit that indicate how many primitives are to be generated for the patch to increase the resolution (i.e., increase the detail) of the patch. The shader preceding the tessellation unit also transmits a domain type to the tessellation unit. The tessellation unit divides a domain into the primitives, and indicates the manner in which the primitives in the domain are to be connected (i.e., the manner in which the primitives in the domain are to be stitched).

The domain is a template shape that the tessellation unit divides into a plurality of primitives. It is these primitives that are then added to the patch to increase the resolution of patch. For example, the additional primitives generated in the domain are then used to form a mesh on the patch, thereby adding detail to the patch.

The shader subsequent to the tessellation unit (e.g., the domain shader in DirectX or the tessellation evaluation shader in OpenGL 4.x) receives the vertices of the primitives generated by the tessellation unit, and connectivity information for the vertices from the tessellation unit. The shader subsequent to the tessellation unit then adds the primitives, as generated by the tessellation unit, to the patch to add more resolution to the surface.

Stitching may be considered as the process of connecting vertices together to form primitives. For example, as part of the tessellation process, the tessellation unit may determine points within the domain. These points form vertices of the primitives. Stitching refers to the process of determining which of these points should be used to generate a primitive within the domain.

Each patch may be subdivided into one or more concentric rings for the purposes of tessellating the patch. The number of rings may be determined based on parameters passed to the tessellation unit. The tessellation unit generates points in the domain on each of the edges of the patch, starting with the points on the outermost edge of the patch, and working inward. The tessellation unit generates the points along the outermost ring and the next outermost ring (which is considered to be an inner ring to the outermost ring), and connects or "stitches" the points of the two rings together. The tessellation unit repeats the process of connecting the points of an outer and an inner ring (i.e., the next outermost ring relative to the outer ring) until all the points of all the rings have been connected.

In accordance with techniques described in this disclosure, the tessellation unit may utilize one or more storage structures such as queues or buffers to store the generated domain points of the outer and inner rings of the patch. Examples of queues include a first-in-first-out (FIFO) queue and examples of buffers include a ring buffer, although the storage structures should not be considered limited to queues and buffers, or these specific types of queues and buffers, and may be extended to other storage structures as well.

When the tessellation unit completes connecting the points of the outer ring with the points of a current inner ring, the points of the outer ring no longer need to be stored. However, for a subsequent stitching iteration, the current inner ring may form the outer ring for a ring that is inner to the current inner ring. For this case, the points of the current inner ring may be reused as points of the outer ring in a subsequent stitching iteration. A subsequent stitching iteration includes connecting the points along the edge of an inner ring (inner relative to the previous inner ring) with the points of an outer ring (which is the inner ring of the previous stitching iteration) in a subsequent iteration. In some examples, the buffers or queues may allow the tessellation unit to reuse previously generated points of the inner ring from a current iteration as the outer ring points in a subsequent stitching iteration.

In this manner, the techniques of this disclosure may increase stitching throughput and reduce the computation required during stitching. For example, the tessellation may not need to restore the previously generated domain points, as these points are already stored within the queues or buffers, in accordance with one or more techniques described in this disclosure. The reduced computation may reduce the amount of power utilized during the stitching process.

FIG. 1 is a block diagram illustrating an example of a graphics processing unit (GPU) that may implement an example of a graphics processing pipeline in accordance with one or more examples described in this disclosure. FIG. 1 illustrates device 10 that includes graphics processing unit (GPU) 12, system memory 14, and central processing unit (CPU) 16. Examples of device 10 include, but are not limited to, mobile wireless telephones, video gaming consoles that include video displays, mobile video conferencing units, laptop computers, desktop computers, television set-top boxes, and the like.

CPU 16 may execute various types of applications. Examples of the applications include web browsers, e-mail applications, spreadsheets, video games, or other applications that generate viewable objects for display. Instructions for execution of the one or more applications may be stored within system memory 14. CPU 16 may transmit graphics data of the generated viewable objects to GPU 12 for further processing.

For example, GPU 12 may be specialized hardware that allows for massive parallel processing, which functions well for processing graphics data. In this way, CPU 16 offloads graphics processing that is better handled by GPU 12. CPU 16 may communicate with GPU 12 in accordance with a particular application processing interface (API). Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

Figure 2:
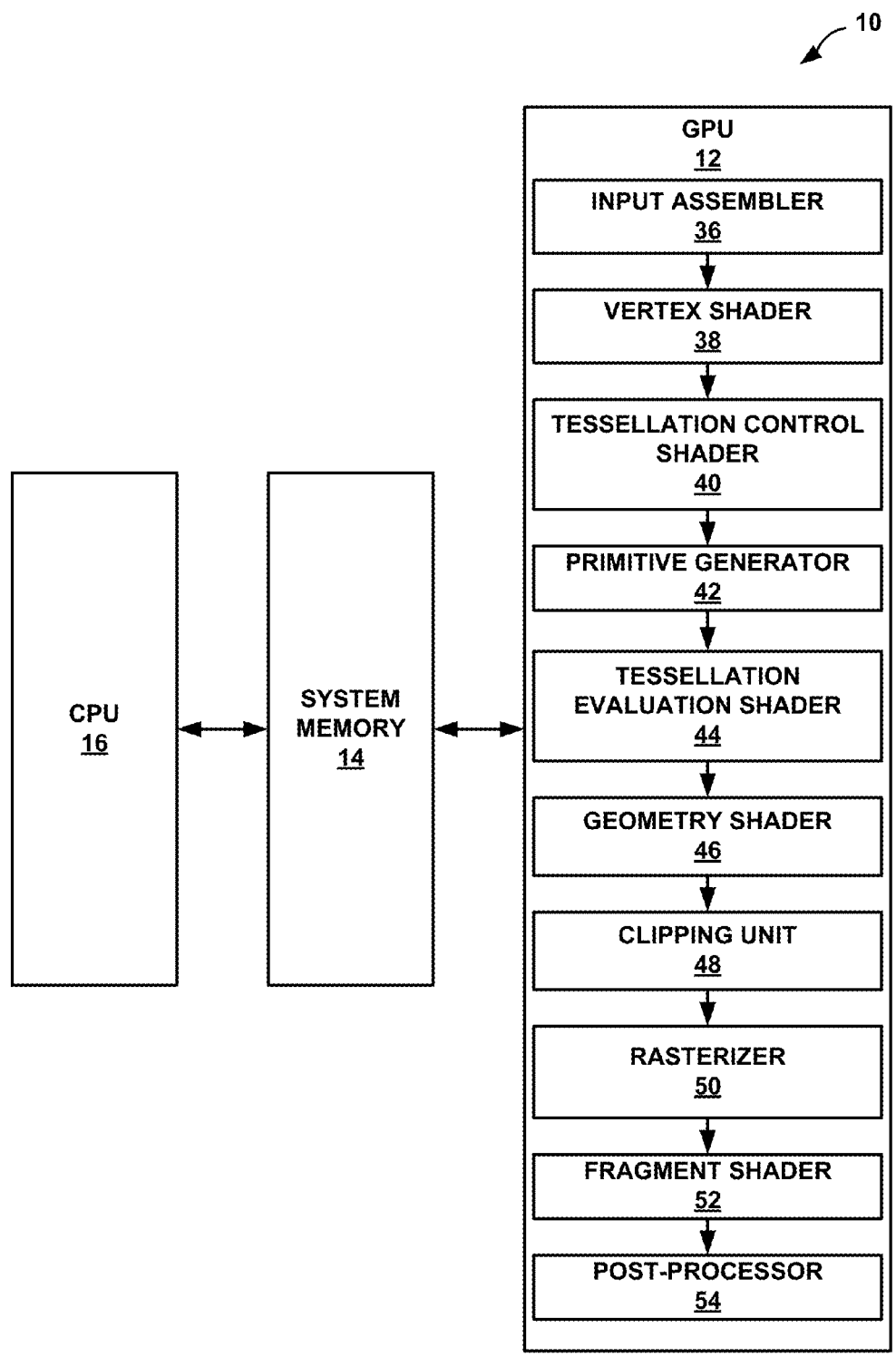
FIG. 2 is a block diagram illustrating another example of a graphics processing unit (GPU) that may implement another example of a graphics processing pipeline in accordance with one or more examples described in this disclosure.

In addition to defining the manner in which GPU 12 is to receive graphics data from CPU 16, the APIs may define a particular graphics processing pipeline that GPU 12 is to implement. GPU 12, in FIG. 1, illustrates the graphics processing pipeline defined by the Direct3D 11 API. As described in more detail, FIG. 2 illustrates the graphics processing pipeline of the OpenGL 4.x API.

Examples of CPU 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing, and may be referred to as a general purpose GPU (GPGPU). The techniques described in this disclosure may also be applicable to examples where GPU 12 is a GPGPU.

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause CPU 16 and/or GPU 12 to perform the functions ascribed to CPU 16 and GPU 12 in this disclosure. Accordingly, system memory 14 may be a computer-readable storage medium comprising instructions that cause one or more processors, e.g., CPU 16 and GPU 12, to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable. As one example, system memory 14 may be removed from device 10, and moved to another device. As another example, a system memory, substantially similar to system memory 14, may be inserted into device 10. In certain examples, a non-transitory storage medium may store data that can, over time, change (e.g., in RAM).

The execution of the applications on CPU 16 causes CPU 16 to generate a plurality of primitives that connect together to form the viewable content. Examples of the primitives include points, lines, triangles, squares, or any other type of polygon. CPU 16 may define these primitives by their respective vertices. For example, CPU 16 may define coordinates and color values for the vertices. The coordinate values may be three-dimensional (3D) coordinates or 2D coordinates.

In some cases, CPU 16 may also generate a special type of primitive referred to as a patch. Similar to the other primitive types, a patch may be defined by a plurality of vertices, referred to as control points of a patch. Unlike other primitive types, the patch may not be any particular shape. For example, CPU 16 may interconnect the control points of the patch in any manner, so that the interconnected control points form any desired shape. For other primitive types such as triangles, CPU 16 may define the specific manner in which the vertices are interconnected (e.g., such that interconnection of the vertices results in a triangle).

Also, unlike other primitive types, the number of control points in a patch may be variable. For example, the application executing on CPU 16 may define a maximum number of control points that are allowed for a patch, or the maximum number of control points may be user-defined. In some examples, the number of control points in a patch may be one to thirty-two control points; however, the techniques described in this disclosure are not so limited.

CPU 16 may utilize the control patch for purposes of tessellation. As described above, a tessellation process refers to CPU 16 defining a portion of a surface of a viewable object in low resolution, and tessellating the portion to generate a higher resolution version of the surface. For example, CPU 16 may define control points of the patch such that when the control points are interconnected the patch forms a portion of a surface of a viewable object. If a surface were to be formed only from the control points of the patch, the surface may not appear with high resolution and may appear jaggy. With tessellation, additional primitives are added to the patch, such that when the primitives are interconnected they add detail to the patch, which increases the resolution of the patch and results in higher quality viewable content.

GPU 12 may be configured to implement tessellation. In this way, CPU 16 may not need to define the vertices for all the additional primitives needed to create the higher resolution patch, which saves on computations performed by CPU 16. Also, CPU 16 may need to transmit fewer vertices (e.g., the vertices of the control points, and not the vertices of the primitives to be added), and GPU 12 may correspondingly need to receive fewer vertices, which promotes bandwidth efficiency due to fewer accesses to system memory 14.

To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

As indicated above, the graphics processing pipeline illustrated in FIG. 1 is a graphic processing pipeline substantially as defined by Direct3D 11. In this example, GPU 12 may include one or more of input assembler stage 18, vertex shader stage 20, hull shader stage 22, tessellation stage 24, domain shader stage 26, geometry shader stage 28, rasterizer stage 30, pixel shader stage 32, and output merge stage 34. GPU 12 may include more stages than those illustrated, and in some examples, GPU 12 may not necessarily include all of the illustrated stages. Also, the specific ordering of the stages is provided for purposes of illustration and should not be considered limiting.

In techniques described in this disclosure, CPU 16 may output the control points of a patch to system memory 14. GPU 12 may then retrieve the control points from system memory 14. In this manner, CPU 16 may transmit the control points to GPU 12. As used in this disclosure, CPU 16 transmitting to GPU 12, or GPU 12 receiving from CPU 16 may generally include CPU 16 writing to system memory 14, from which GPU 12 receives. Alternatively, it may be possible for CPU 16 to directly transmit to GPU 12, and for GPU 12 to directly receive from CPU 16.

Input assembler stage 18 may read the control points from system memory 14 as defined by CPU 16, and assemble the control points to form the patch. For instance, input assembler stage 18 may read the coordinates, color values, and other such information of the control points. The coordinates, color values, and other such information may be commonly referred to as attributes of the control points. Based on the attributes of the control points, input assembler stage 18 may determine the general layout of the patch. In this manner, input assembler stage 18 may assemble the control points to form the patch. Input assembler stage 18 may be a fixed-function unit.

Vertex shader stage 20 may process the vertices (e.g., the control points of the patch) from input assembler stage 18. For example, vertex shader stage 20 may perform per-vertex operations such as transformations, skinning, morphing, and per-vertex lighting. Vertex shader stage 20 may be a shader.

Hull shader stage 22 receives the control points of the patch, as processed by vertex shader stage 20, process the control points, and outputs control points for a processed patch. In other words, hull shader stage 22 receives an input patch, as processed by vertex shader stage 20, processes the input patch, and outputs an output patch. Hull shader stage 22 may perform various functions for processing the input patch. For example, hull shader stage 22 may modify the coordinates of the control points to change the locations of the control points, or may even add or delete control points.

In addition, hull shader stage 22 may determine values that indicate how many primitives are to be added to the patch generated by hull shader stage 22 (i.e., the output patch). Hull shader stage 22 may utilize various criteria to determine how many primitives are to be added to the patch. Described below are two example criteria that hull shader stage 22 may utilize to determine how many primitives are to be added to the patch. However, aspects of this disclosure are not so limited, and hull shader stage 22 may utilize any criteria to determine how many primitives should be added to the patch.

As one example, hull shader stage 22 may utilize information indicative of the depth of the patch to determine how many primitives should be added. For instance, a patch that is further away, from the perspective of the viewer, may not need high resolution because objects further in distance appear blurry in real life. However, a patch that is closer, from the perspective of the viewer, may need higher resolution because objects closer in distance appear sharper in real life.

In this example, hull shader stage 22 may determine that fewer primitives should be added to the patch that is further away, and more primitives should be added to the patch that is closer, relative to one another.

As another example, hull shader stage 22 may determine how many primitives should be added based on the size of the patch. For a smaller sized patch, hull shader stage 22 may determine that fewer primitives should be added because the patch encompasses a smaller area. For a larger sized patch, hull shader stage 22 may determine that more primitives should be added because the patch encompasses a larger area.

Based on a determination of how many primitives should be added, hull shader stage 22 may output a domain type and values that indicate how many primitives are to be added to the patch to tessellation stage 24. The values that indicate how many primitives are to be added to the patch, in the Direct3D 11 API, are referred to as tessfactors.

The domain may be a considered as a template shape that tessellation stage 24 uses for tessellation purposes. Examples of the domain type include a line, a triangle, a quad (e.g., a four sided polygon), or any other type of polygon. The domain may be a two-dimensional (2D) shape, even if the patches define a three-dimensional (3D) surface or a 2D surface. When the domain is a line, the domain may be a one-dimensional (1D) shape (i.e., a line), even if the patches define a 3D surface, a 2D surface, or a 1D surface. For purposes of illustration, the techniques described in this disclosure are described with respect to the domain being a 2D surface. For instance, the techniques are described with domain shapes that are the triangle or quad.

In some examples, hull shader stage 22 may not explicitly indicate the domain type. Rather, tessellation stage 24 may determine the domain type based on the number of transmitted tessfactors. For example, the presence of four tessfactors may indicate that the domain type is a triangle domain type, and the presence of six tessfactors may indicate that the domain type is a quad domain type.

In some examples, a quad domain may be defined by 2D Cartesian coordinates (u, v). In some examples, a triangle domain may be defined by Barycentric coordinates. Barycentric coordinates utilize three coordinates to identify any point within the triangle. For example, the vertices of the triangle domain may be defined as (u, v, w), as described below in more detail. The location of any point within the triangle is defined by vertex weighting that indicates its proximity to a vertex. For instance, the closer a point is to a vertex, the higher its vertex weighting, and the further away the point is from the vertex, the lower its vertex weighting.

As an example, assume the vertices of the triangle are defined with Barycentric coordinates (u, v, w) as follows: (1, 0, 0), (0, 1, 0), and (0, 0, 1). In this example, the center point is located at ($\frac{1}{3}$, $\frac{1}{3}$, $\frac{1}{3}$) because the center point is equally distant from each of the vertices. Also, with the given definition of the vertex coordinates, in this example, the sum of the u, v, and w coordinates for any point within the triangle domain should equal one.

The Cartesian and Barycentric coordinates are described for purposes of illustration only, and should not be considered limiting. In other examples, it may be possible to define the quad domain with Barycentric coordinates or Cartesian coordinates, and the triangle domain with Cartesian coordinates or Barycentric coordinates. In general, a domain, of any type, may be defined using any coordinate system.

Tessellation stage 24 may tessellate (e.g., divide) the domain into a plurality of primitives. It should be understood that, in this example, tessellation stage 24 is not dividing the patch outputted by hull shader stage 22 into primitives, but rather dividing the domain into the primitives. In some examples, tessellation stage 24 may not even have access to the patch outputted by hull shader stage 22. Tessellation stage 24 may be a fixed-function unit, although aspects of this disclosure need not be so limited.

Tessellation stage 24 may utilize the tessfactors outputted by hull shader stage 22 to tessellate (e.g., divide) the domain into a plurality of primitives. For example, in addition to defining the domain type (e.g., triangle or quad) the tessfactors may define how many rings are to be included within the domain.

A ring may be a series of concentric shapes within the domain, where the concentric shapes are the same shape as the domain shape. For example, if the domain shape is a quad, the perimeter of the quad may be considered as the outer ring. Hull shader stage 22 may define the number of inner rings, which may be series of smaller sized quads that reside within the quad domain. Similarly, if the domain shape is a triangle, the perimeter of the triangle may be considered as the outer ring, and the inner rings may be series of smaller sized triangles that reside within the triangle domain.

In addition to defining the number of rings within a domain, the tessfactors define the points that reside along the rings. The points that reside along the rings should not be confused with control points. The control points define the patch. The points that reside along the rings are points generated by tessellation stage 24 based on the tessfactors. These points are generated within the domain, and not within the patch.

Also, it is these points that tessellation stage 24 connects together to divide the domain into a plurality of primitives. For example, assume that the primitives that tessellation stage 24 will divide the domain into are triangles. In this example, tessellation stage 24 may connect one point that resides along the outer ring, with two points that reside along the inner ring to form a triangle primitive. Alternatively, tessellation stage 24 may connect two points that reside along the outer ring with one point that resides along the inner ring to form a triangle primitive. In this way, by defining the domain type, the number of rings within the domain, and the number of points along the outer and inner rings, hull shader stage 22 may define the number of primitives into which tessellation stage 24 should divide the domain.

In some examples, the number of points that can reside along an edge of ring may be one point to 64. For example, if the domain type is a triangle, than there may be up to 64 points per edge of the triangle domain. Similarly, if the domain type is a quad, than there may be up to 64 points per edge of the quad. However, the techniques described in this disclosure are not limited to an edge having a maximum of 64 points.

Furthermore, the number of points that reside along a ring may be different for outer and inner rings. For example, the number of points that reside along an edge of the outer ring may be more than or less than the number points that reside along an edge of the inner ring. It may also be possible that number of points that reside along the edge of the outer ring and the inner ring are the same number of points.

Moreover, the number points along an edge of the same ring may be different. For example, for a triangle domain, the number of points that reside along one of the edges may be different than the number of points that reside along one other edge, or both edges. Similarly, for a quad domain, the number of points that reside along one of the edges may be different than the number of points that reside along one, two, or all three other, remaining edges. It may also be possible for each of the edges of the rings to have the same number of points.

As described above, in some examples, tessellation stage 24 may not divide the patch into a plurality of primitives. Accordingly, in some examples, tessellation stage 24 may not receive any information such as the number of control points, the locations of the control points, or the size of the patch. Without any information as to the size of the patch and the locations of the control points, tessellation stage 24 may not be able to define the size of the domain that is used or the specific coordinates for the vertices of the domain.

To address this, tessellation stage 24 may rely upon a normalized coordinate system for defining the vertices of the domain, as well as for determining the locations of the interconnected points within the domain. For example, in a quad domain each of four edges may be normalized from "0" to "1." Accordingly, a normalized quad domain may include Cartesian coordinates (u, v) of (0,0), (1,0), (0,1), (1,1). Similarly, in an example of triangular domain, each of three edges may be normalized from "0" to "1." Accordingly, a normalized triangle domain may have Barycentric coordinates (u, v, w) of (0,0,1), (0,1,0), (1,0,0). Additionally, when using normalized Barycentric coordinates in the triangular domain, the sum of each coordinate set is always one, e.g., for (0,0,1) 0+0+1=1; for (0,1,0) 0+1+0=1; and for (1,0,0) 1+0+0=1. Once an edge has been normalized, the tessellation unit may determine the coordinates of each point of the edge based on the tessellation factor.

Tessellation stage 24 may store coordinates of the points, as defined based on the normalized coordinate system, along each edge in one or more queues or buffers. The coordinates of the normalized points may be referred as point coordinates. For ease of explanation, the term "queues" may refer to queues or buffers, unless specified otherwise. In one example, tessellation stage 24 may enqueue point coordinates from an outer ring of the domain in one queue, and the point coordinates of an inner ring of the domain in two separate queues. In another example, tessellation stage 24 may store both the point coordinates of the outer ring and the point coordinates of the inner ring in the same queue. "Enqueue" or "enqueuing," as used in this disclosure, refers to a tessellation unit, such as tessellation stage 24, storing point coordinates in the queue or queues. After tessellation stage 24 has stored the normalized points of the outer and inner rings in the single queue or the two separate queues, tessellation stage 24 may connect the points and remove the points from the queue(s).

In this manner, a tessellation unit, such as tessellation stage 24, may be configured to determine first outer ring point coordinates for a first point of an outer ring of the domain, and determine first inner ring point coordinates for a first point of an inner ring of the domain. In this example the inner ring is inner to the outer ring within the domain.

The tessellation unit may enqueue the first inner ring point coordinates at a first location of a queue, read the first inner ring point coordinates from the queue, and read the first outer ring point coordinates from the queue when the outer ring is not an outermost ring. In this example, the first outer ring point coordinates were previously enqueued in the queue when the outer ring was a previous inner ring. The tessellation unit may connect the first inner ring coordinates and the first outer ring coordinates each of which being read from the queue. The connection of the first inner ring coordinate and the first outer ring coordinates may be referred to as a stitching iteration.

For example, as described above, the domain may include a series of concentric rings. In this example, the perimeter of the domain may form the outermost ring. The next outermost ring may form an inner ring to the outermost ring, and may form an outer ring for the next concentric ring.

In some examples, the points that reside along the outermost ring and the next outermost ring may be connected together to form a plurality of triangles, in what is referred to as a first stitching iteration. Then in the next stitching iteration, the points that reside along the next outermost ring may be connected with points that reside along the next concentric ring, which is an inner ring to the next outermost ring.

In some examples described in this disclosure, the point coordinates for the next outermost ring, which is the case when the outer ring is not the outermost ring, may have already been previously enqueued in the queue. For example, these point coordinates may be been previously enqueued in the queue when the next outermost ring functioned as the inner ring to the outermost ring during the first stitching iteration. In this case, the tessellation unit may not need to re-determine the point coordinates for the points that reside along the next outermost ring, and may be able to read the point coordinates from the queue.

Tessellation stage 24 may output the vertices of the plurality of primitives of the domain to domain shader stage 26 in the normalized coordinate system (e.g., the u, v coordinates or the u, v, w coordinates, as applicable). The function of domain shader stage 26 may be to map the vertex coordinates, as received from tessellation stage 24, on to the patch. For example, while tessellation stage 24 may not receive information of the patch as defined by hull shader stage 22, domain shader stage 26 may receive such information from hull shader stage 22.

Domain shader stage 26 may execute for each vertex coordinate outputted by tessellation stage 24. With the coordinates of the control points of the patch from hull shader stage 22, domain shader stage 26 may determine the location of the vertex, as outputted by tessellation stage 24, on the patch. Because tessellation stage 24 outputs vertices of the plurality of primitives generated by tessellation stage 24, and domain shader stage 26 adds these primitives to the patch, the combination of hull shader stage 22, tessellation stage 24, and domain shader stage 26 together add additional primitives to the patch. This results in a mesh of primitives that are added to the patch creating a higher resolution, more detailed patch, as compared to the patch defined by CPU 16. In this manner, hull shader stage 22, tessellation stage 24, and domain shader stage 26 implement a tessellation process.

Geometry shader stage 28 receives the vertices of the primitives added to the patch by domain shader stage 26 and may further generate additional vertices for the primitives to add even more resolution. Rasterizer stage 30 receives the primitives from geometry shader stage 28 and converts the primitives into pixels for the display. For example, the primitives may be defined as vectors that indicate the interconnection of the primitives, and may be defined in a coordinate space that is independent of the display on which the image is to be displayed. Rasterizer stage 30 converts these vectors into the display coordinates, and performs any additional functions such as removing points within primitives that are occluded.

Pixel shader stage 32 receives the pixels as outputted by rasterizer stage 30 and performs post processing to assign color values to each of the pixels that are to be displayed. For example, pixel shader stage 32 may receive constant values stored in system memory 14, texture data stored in system memory 14, and any other data to generate per-pixel outputs such as color values. Pixel shader stage 32 may also output opacity values that indicate the opaqueness of the pixels.

Output merge stage 34 may perform any final pixel processing. For example, output merge stage 34 may utilize depth information to further determine whether any of the pixels should be removed from being displayed. Output merge stage 34 may also perform blending operations to generate final pixel values.

Output merge stage 34 may output the final pixel values to a frame buffer, generally located within system memory 14, but which may be located within GPU 12. A display processor (not shown) may retrieve the pixel values from the frame buffer and cause pixels of a display (not shown) of device 10 to illuminate accordingly to the pixel values to cause the display to display the image.

As described above, tessellation stage 24 interconnects points of the outer and inner rings within the domain to generate a plurality of primitives within the domain. In accordance with techniques described in this disclosure, tessellation stage 24 may utilize one or more queues to store the points of the outer and inner rings, which tessellation stage 24 interconnects.

In some examples, GPU 12 may include queues, such as first-in, first-out (FIFO) queues, and/or buffers, such as ring buffers, that may be used solely for storing points of outer and inner rings. The queues may be coupled with tessellation stage 24 in such a manner that tessellation stage 24 may quickly access the contents of the queues. In some examples, GPU 12 may comprise local memory such as cache memory, and the cache memory may store the queues. In some other examples, system memory 14 may store the queues. For purposes of bandwidth efficiency, it may be desirable for the local memory of GPU 12 to store the queues rather than system memory 14.

The specific way in which the points are to be connected may define how many points are to be read from each of the queues. For example, assume that tessellation stage 24 divides a quad domain into triangle primitives. In this example, two points may be taken from a location of the queues that contains points from the outer ring, and one point may be read from the location of the queues that contains points of the inner ring edge of the domain to form the triangle. In some examples, when tessellation stage 24 reads points from the queues, tessellation stage 24 may also remove, dequeue, or "pop" the read points from the queues. In another example, tessellation stage 24 may read one point from a location of one of the queues that contains points of the outer ring edge, and may read two points from a location of one of the queues that contains points of the inner ring edge to form a triangle.

For stitching (e.g., connecting points that reside along the outer and inner rings), the outer ring edge and the inner ring edge may be parallel with one another. In other words, the edges that are used for forming the primitives are corresponding edges in the outer and inner rings. For example, when stitching primitives with points along the left edge of an outer ring of a quad domain, tessellation stage 24 may utilize the points along the left edge of the inner ring of the quad domain. The same may apply for the top, bottom, and right edges of the outer and inner rings.

In some examples, the tessfactor that indicates the number of points that reside along the outer ring edge may define whether one queue may be used to hold the points that reside along both the inner and outer rings, or whether two separate queues will be used to hold the points from the inner and outer rings. When two separate queues are used, tessellation stage 24 may regenerate the values of the point coordinates for the outer and inner rings for each stitching iteration.

For example, as described above, in some examples the points that reside along an outer ring, when the outer ring is not the outermost ring, may have been previously enqueued, and therefore re-determining the point coordinates may not be necessary. However, this may not be the case in every example. In some examples, the number of points that reside along a ring, as indicated by the tessfactors, may determine whether the points that reside along the outer ring and the inner ring should be stored in the same queue, or two different queues. When stored in two different queues, tessellation stage 24 may regenerate the values of the point coordinates as described above.

If the tessfactors indicate that a number of points that reside along a ring that is inner to the outermost ring is greater than a threshold number of points, tessellation stage 24 may store the points in two different queues. If the number of points that reside along the outermost ring is less than or equal to the threshold number of points, tessellation stage 24 may store the points that reside on the inner and outer rings in a single queue. In some examples, the queue may be a ring buffer. Tessellation stage 24 may write the points the points that reside along an outer ring to the buffer at a location specified by an inner ring write pointer.

Tessellation stage 24 may read the points of the outer ring buffer from a location of the ring buffer indicated by an outer ring pointer. Tessellation stage 24 may read the points that reside along an inner ring from a location of the ring buffer indicated by an inner ring read pointer. The points of the inner ring and the outer ring may be logically separated from each other in the ring buffer by an end of ring value, which tessellation stage 24 may also store in the ring buffer.

Accordingly, in some examples, the techniques described in this disclosure may increase the computational efficiency of the graphics processing pipeline of GPU 12, relative to the case where tessellation stage 24 regenerates the point coordinates of both the inner and outer rings for each stitching iteration. Furthermore, because tessellation stage 24 may use only one queue, rather than two separate queues, when the outer ring is not the outermost ring, to write and read the points of the domain, the number of accesses to the queues, the local memory of GPU 12 or system memory 14 may be reduced, resulting in a reduction in power consumption and an increase in bandwidth efficiency. In a case where the queues comprise hardware queues, tessellation stage 24 may also be able to turn off or disable transistors associated with unused hardware queues, resulting in decreased power consumption.

FIG. 2 is a block diagram illustrating another example of a graphics processing unit (GPU) that may implement another example of a graphics processing pipeline in accordance with one or more examples described in this disclosure. For instance, FIG. 1 illustrated a graphics processing pipeline formulated substantially in accordance with the Direct3D 11 API. FIG. 2 illustrates the graphics processing pipeline substantially in accordance with the OpenGL 4.x API.

The OpenGL 4.x graphics processing pipeline may function in a substantially similar fashion as the Direct3D 11 graphics processing pipeline. Accordingly, for purposes of brevity, reference is made to FIG. 1 to describe components that are similar to both the Direct3D 11 graphics processing pipeline and the OpenGL 4.x graphics processing pipeline.

As illustrated in the example of FIG. 2, GPU 12 includes input assembler 36, vertex shader 38, tessellation control shader 40, primitive generator 42, tessellation evaluation shader 44, geometry shader 46, clipping unit 48, rasterizer 50, fragment shader 52, and post-processor 54. Similar to FIG. 1, in the example illustrated in FIG. 2, GPU 12 may include more or fewer components than those illustrated in FIG. 2. Also, the specific ordering of the unit is provided for purposes of illustration and should not be considered limiting.

In some ways, the tessellation process with the OpenGL 4.x graphics processing pipeline may be substantially similar to the tessellation process with the Direct3D 11 graphics processing pipeline. For example, OpenGL 4.x tessellation process may rely upon patches and control points, in the manner similar to that described above with respect to FIG. 1. For instance, input assembler 36 and vertex shader 38 of FIG. 2 may function substantially similar as input assembler stage 18 and vertex shader stage 20 of FIG. 1, respectively.

As more examples, for tessellation, tessellation control shader 40 of FIG. 2 may function substantially similarly to hull shader stage 22 of FIG. 1. However, tessellation control shader 40 outputs tessellation levels, which may be analogous to the tessfactors of Direct3D 11. For example, the tessellation levels of OpenGL 4.x may define the domain type, the number of rings within the domain, and the number of points per ring edge.

Primitive generator 42 may function in a substantially similar manner as tessellation stage 24. For example, primitive generator 42 may utilize the tessellation levels and the domain type to divide the domain into a plurality of primitives.

Tessellation evaluation shader 44 of FIG. 2 may function substantially similarly to domain shader stage 26 of FIG. 1. For example, tessellation evaluation shader 44 may receive the vertices of the generated primitives from primitive generator 42 and add the primitive to the patch outputted by tessellation control shader 40. In this manner, the graphics processing pipeline of the OpenGL 4.x API may perform tessellation on a patch to increase the resolution of the patch.

Geometry shader 46 may function substantially similar to geometry shader stage 28. The combination of clipping unit 48 and rasterizer 50, in FIG. 2, may function substantially similarly to rasterizer stage 30 in FIG. 1. Fragment shader 52 and post-processor 54 in FIG. 2 may function substantially similar to pixel shader stage 32 and output merge stage 34 in FIG. 1, respectively. Post-processor 54 may output the final pixel values to a frame buffer and the display processor may retrieve the pixel values from the frame buffer and cause a display to illuminate according to the pixel values to display the image.

As described above, tessellation control shader 40, primitive generator 42, and tessellation evaluation shader 44 of FIG. 2 function substantially similar to hull shader stage 22, tessellation stage 24, and domain shader stage 26 of FIG. 1, respectively, for implementing the tessellation process. Accordingly, both the Direct3D 11 and the OpenGL 4.x APIs rely upon two programmable shader units and one fixed-function unit to implement the tessellation process.

For purposes of generality, the techniques described in this disclosure may be described with a first tessellation shader unit, a tessellation unit, and a second tessellation shader unit. Examples of the first tessellation shader unit include hull shader stage 22 and tessellation control shader 40. Examples of the tessellation unit include tessellation stage 24 and primitive generator 42. Examples of the second tessellation shader unit include domain shader stage 26 and tessellation evaluation shader 44.

Also, Direct3D 11 uses the term "tessfactors" and OpenGL 4.x uses the term "tessellation levels," which may be considered analogous terms. For purposes of generality, this disclosure uses the term "tessellation factor," examples of which include tessfactors and tessellation levels. In this way, the first shader unit may be considered as outputting tessellation factors to the tessellation unit, and the tessellation unit may output vertices to the second shader unit in response to the tessellation factors.

It should be noted that while the Direct3D 11 and OpenGL 4.x utilize two shader units and one fixed-function unit, the techniques described in this disclosure are not so limited. For example, it may be possible in other systems for the first and second shader units to be fixed-function units and the tessellation unit to be a shader unit. As another example, all may be fixed-function units or all may be shader units, or any combination thereof.

Therefore, in some examples, it may be considered that a first unit performs functions similar to the first shader unit, but may be a shader unit or a fixed-function unit, a second unit performs functions similar to the tessellation unit, but may be a shader unit or a fixed-function unit, and a third unit performs functions similar to the second shader unit, but may be a shader unit or a fixed-function unit. Moreover, although the first shader unit, the tessellation unit, and the second shader unit are illustrated as separate units in FIGS. 1 and 2, aspects of this disclosure are not so limited. These units, and possibly any unit of the graphics processing pipelines illustrated in FIGS. 1 and 2, may be combined together into a common unit. Accordingly, while the functionality of these units is described separately for ease of description, these units may be implemented in shared hardware or as distinct components.

Figure 3A:
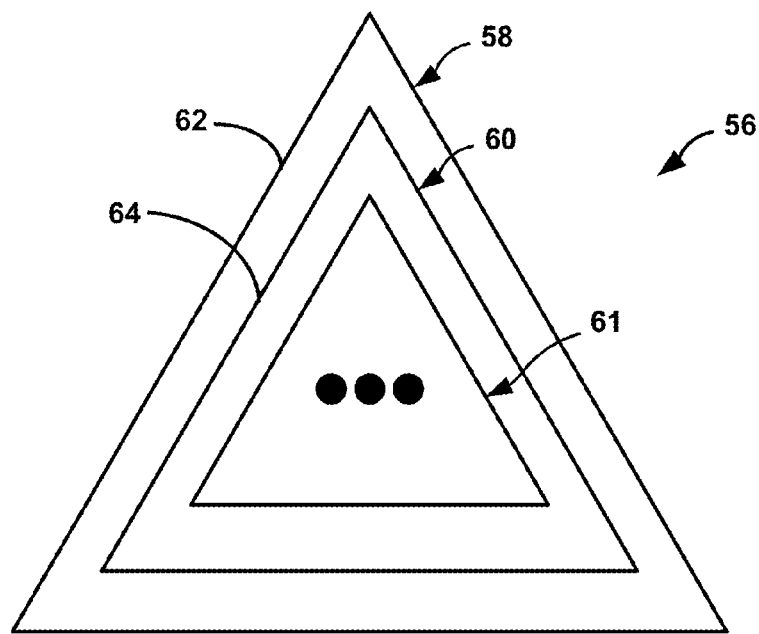
FIGS. 3A and 3B are graphical diagrams illustrating examples of domain types that include a plurality of inner rings for stitching in accordance with one or more examples described in this disclosure.
Figure 3B:
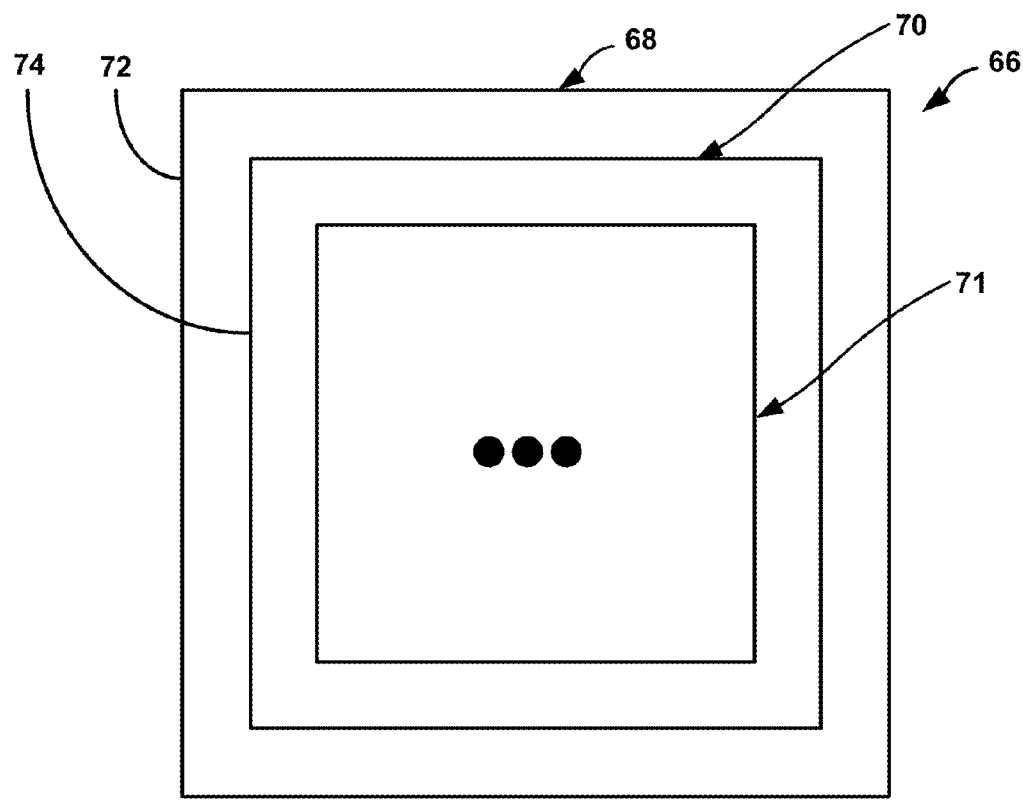

FIGS. 3A and 3B are graphical diagrams illustrating examples of domain types that include a plurality of inner rings in accordance with one or more examples described in this disclosure. For example, FIG. 3A illustrates triangle domain 56 and FIG. 3B illustrates quad domain 66. As illustrated, triangle domain 56 and quad domain 66 each include concentric triangles and squares, respectively.

In FIG. 3A, triangle domain 56 includes outer ring 58, inner ring 60, and inner ring 61. Outer ring 58 includes outer ring edge 62, and inner ring 60 includes inner ring edge 64. Outer ring edge 62 and inner ring edge 64 are parallel with one another. In aspects described in this disclosure, the tessellation unit may interconnect (i.e., stitch) points along outer ring edge 62 with the points along inner ring edge 64. For example, the tessellation factors may define the number of points that reside along outer ring edge 62 and the number of points that reside along inner ring edge 64. As indicated in FIG. 3A, there is an addition inner ring, which is inner to inner ring edge 64.

During each stitching iteration, the tessellation unit may determine the points along an outer edge and an inner edge. The tessellation unit may store the points in one or more queues. The tessellation unit may read the generated points from the queues, and interconnect the points. The tessellation unit repeats this process for each ring of the domain until the points from the rings have been connected.

As an example, in a first stitching iteration, tessellation stage 24 may begin determining the coordinates of the points along outer ring 62 and inner ring 64. The tessellation unit may store the coordinates for the points (e.g., point coordinates) in one or more queues as the point coordinates are determined. The tessellation unit may read the outer ring point coordinates from the queues and the inner ring point coordinates from the queues and may interconnect the points together.

After generating the primitive whose vertices reside along outer ring edge 62 and inner ring edge 64, the tessellation unit may advance to the other two edges of outer ring 58 and inner ring 60 in a clockwise fashion, in this example. For each of these edges of outer ring 58 and inner ring 60, the tessellation unit may determine the points along each edge. Each point may be comprised of coordinates of the normalized coordinates system. The tessellation unit may store the point coordinates in the queues, read the points from the queues, and interconnect the points.

In some examples, after the tessellation unit completes the stitching of the primitives whose vertices reside along outer ring 58 and inner ring 60, the tessellation unit may proceed with the next inner ring. In this case, inner ring 60 becomes the outer ring, and the ring following inner ring 60 becomes the inner ring 61, and the process of determining points along each edge, storing the points in the queues, and connecting the points repeats until, upon progressively proceeding inward, until there are no more rings.

During the first stitching iteration, the tessellation unit may store the points of outer ring 58 and inner ring 60 in separate queues. In subsequent stitching iterations, in some but not all examples (as described below), the tessellation unit may store the points of the inner and outer rings in the same queue. For example, in the next stitching iteration, ring 60 becomes the outer ring, and ring 61 becomes the inner ring. In this example, the point coordinates for ring 60 were previously enqueued (e.g., stored) in the queue during the first iteration, and the tessellation unit may store the point coordinates for the points along ring 61, which is the inner ring in this iteration, within the same queue in which the tessellation unit stored the point coordinates for ring 60, which is the outer ring in this iteration, and the inner ring the previous iteration. In this manner, the tessellation unit may also reuse the inner ring points stored in the queue in a previous stitching iteration as outer ring points in a subsequent stitching iteration.

In some alternate examples, it may not be necessary for the tessellation unit to always store the point coordinates for the inner and outer ring is the same queue. In these alternate examples, the tessellation unit may utilize the tessellation factors to determine whether to utilize a single queue or two separate queues when storing the points of the inner and outer rings of the domain.

For instance, the tessellation factors may define how many points along outer ring 58 and how many points along inner ring 60 the tessellation unit should interconnect to form the primitives whose vertices reside along outer ring 58 and inner ring 60. If the number of points on inner ring 60 is greater than a threshold number of points, the tessellation unit may use two queues to store the inner and outer ring points.

Storing point coordinates in different queues based on a threshold number of points may be beneficial in terms of the amount of needed memory for storing the point coordinates. For example, if the number of points along one of or both ring 60 and ring 61 (i.e., the outer ring and inner ring, respectively in this example), is relatively large, then the size of queue may be relatively large so that the queue can store the point coordinates for ring 60 and ring 61. By utilizing two queues, based on when the number points is greater than a threshold value, it may be possible to size the two queues in such a way that the total size of the two queues is less than the size of a single queue.

In other words, if the number of points on inner ring 60 is greater than the threshold number of points, issues in terms of memory, area, and/or power for a queue that could hold a number of points greater than the threshold number of points, may be relatively large. Accordingly, when the number of points on inner ring 60 exceeds the threshold, the tessellation unit may simply store points from an outer ring, such as outer ring 58, in one queue, and the points from an inner ring, such as inner ring 60, in a separate different queue. In this example, the points from inner ring 60, which were determined in a previous stitching iteration may not be reused as the points of an outer ring in a subsequent iteration.

In this example, if the number of points on inner ring 60 is less than the threshold, and the outer ring is not the outermost ring of the domain, the tessellation unit may use a single queue to store both the points of the inner ring and the outer ring. The single queue may be large enough to store all the points generated for one ring such that the tessellation unit may reuse the previously determined points of an inner edge as points along an outer edge in a subsequent stitching iteration. In the subsequent iteration, the tessellation unit may read the inner ring points of the previous stitching iteration from the single queue, connect the points, and remove them from the queue after connecting them.

During a first stitching iteration when the outer ring is the outermost ring, e.g. when outer ring 58 is the outer ring, and ring 60 is the inner ring, the tessellation unit may utilize two different queues to store the points of the outer ring and the points of the inner ring. If the number of points that reside on inner ring 60 is less than or equal to the threshold number of points, the tessellation unit may store the points of both the inner and outer rings in the same queue for subsequent iterations (i.e. iterations where the outer ring is not outer ring 58). If the number of points that reside on the ring that is inner to the outermost ring, e.g. ring 60, is greater than the threshold number of points, the tessellation unit may use two different queues to store the points of the inner and outer rings, as described above.

The tessellation unit may perform similar function on quad domain 66. For example, in FIG. 3B, quad domain 66 includes outer ring 68 and inner ring 70. As illustrated, there is another inner ring (i.e., ring 71), which is inner to inner ring 70. Outer ring 68 includes outer ring edge 72, and inner ring 70 includes inner ring edge 74. Outer ring edge 62 and inner ring edge 64 are parallel with one another, and the points along these edges may form primitives (e.g., may be vertices of the primitives).

Similar to the example of FIG. 3A, the tessellation unit may utilize one queue or two different queues to store the points generated along ring 70 and ring 71. The tessellation factors for inner ring edge 70 may determine whether the tessellation unit uses one or two queues to store the points from the two rings. In one example, if the number of points that reside on inner ring 70 is less than or equal to the threshold number of points, the tessellation unit may use one queue to store the points of the inner and outer rings, such as inner ring 70 (which may also be an outer ring in some iterations), and inner ring 71. In another example, the tessellation unit may use a single queue to store the points of the inner and outer rings regardless of the number of points that reside along inner edge 70, when the outer ring is not the outermost ring (outer ring 68). The tessellation unit may connect (e.g., stitch) the points of the outer and inner rings utilizing any technique for determining which points along the outer ring and which points along the inner ring.

After generating the primitive whose vertices reside along outer ring edge 72 and inner ring edge 74, the tessellation unit may advance to the other two edges of outer ring 68 and inner ring 70 in a clockwise fashion, in this example. Based on the number of number of points along each edge, which may be defined by one or more tessellation factors, the tessellation unit may determine whether to use one queue or two separate queues to store the points along the inner and outer rings. In some examples, after the tessellation unit completes the stitching of the primitives whose vertices reside along outer ring 68 and inner ring 70, the tessellation unit may proceed with the next inner ring. In this case, inner ring 70 becomes the outer ring, and the ring following inner ring 70 (i.e., ring 71) becomes the inner ring, and the process of storing (i.e., enqueueing) points in the one or more queues, reading the points from the queues, and connecting the one or more points repeats until, upon progressively proceeding inward, there are no more rings.

Figure 4A:
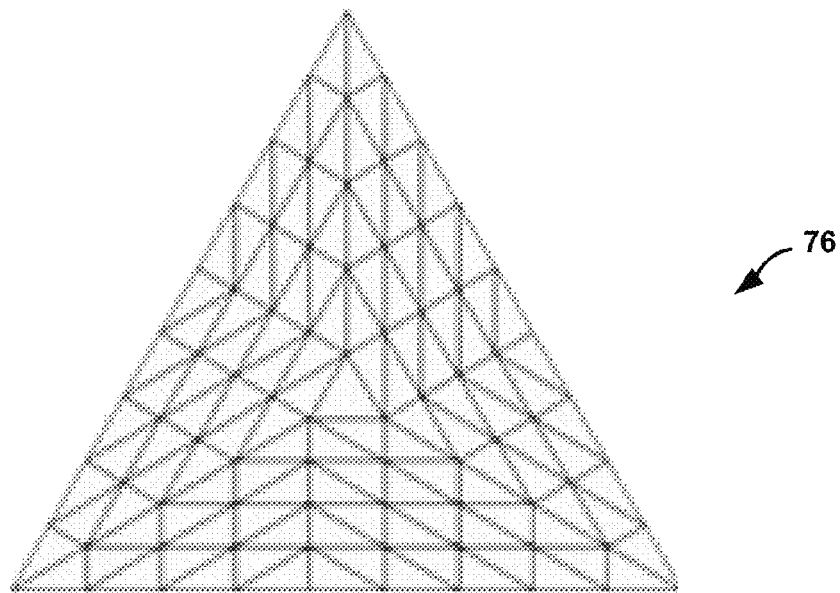
FIGS. 4A and 4B are graphical diagrams illustrating a domain divided into a plurality of primitives in accordance with one or more examples described in this disclosure.
Figure 4B:
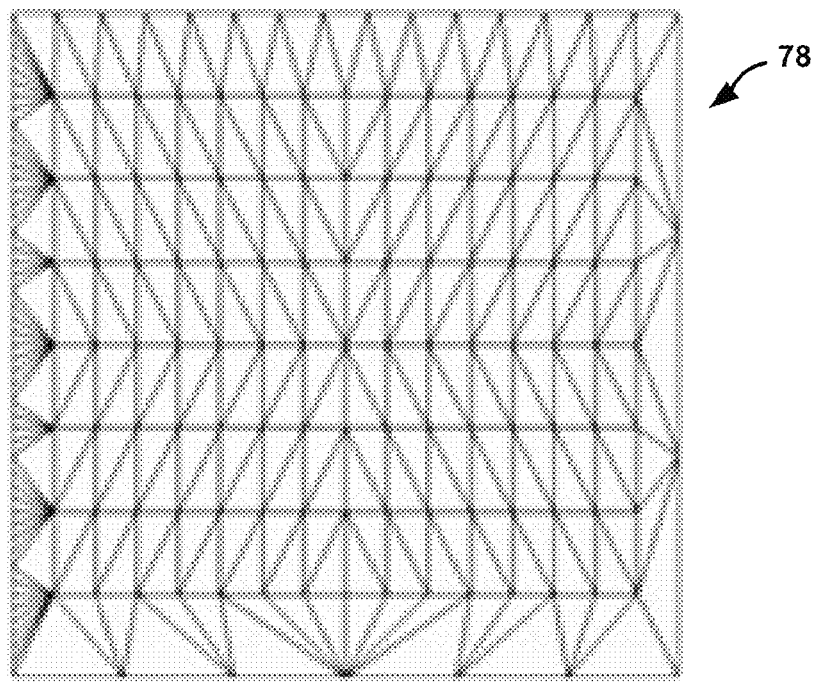

FIGS. 4A and 4B are graphical diagrams illustrating a domain divided into a plurality of primitives in accordance with one or more examples described in this disclosure. For example, FIG. 4A illustrates triangle domain 76 divided (i.e., tessellated) into a plurality of primitives, and FIG. 4B illustrates quad domain 78 divided into a plurality of primitives. In FIGS. 4A and 4B, the interconnection of the points that form the triangle may be based on the tessellation factors. For example, the dense interconnections at the left edge of FIG. 4B are due to the interconnections as defined by the tessellation factors. For example, the tessellation factors for the left edge of FIG. 4B may indicate that a relatively high number of interconnections, and a correspondingly high number of points are required to be determined for the left edge of FIG. 4B. Due to the relatively large number of points that the tessellation unit determines on the left edge and the outermost edge of FIG. 4B, the tessellation unit may determine that two separate queues should be used to store the points of FIG. 4B during stitching. The tessellation unit may store points of the outer ring in a first queue, and points of the inner ring in a second queue.

Figure 5:
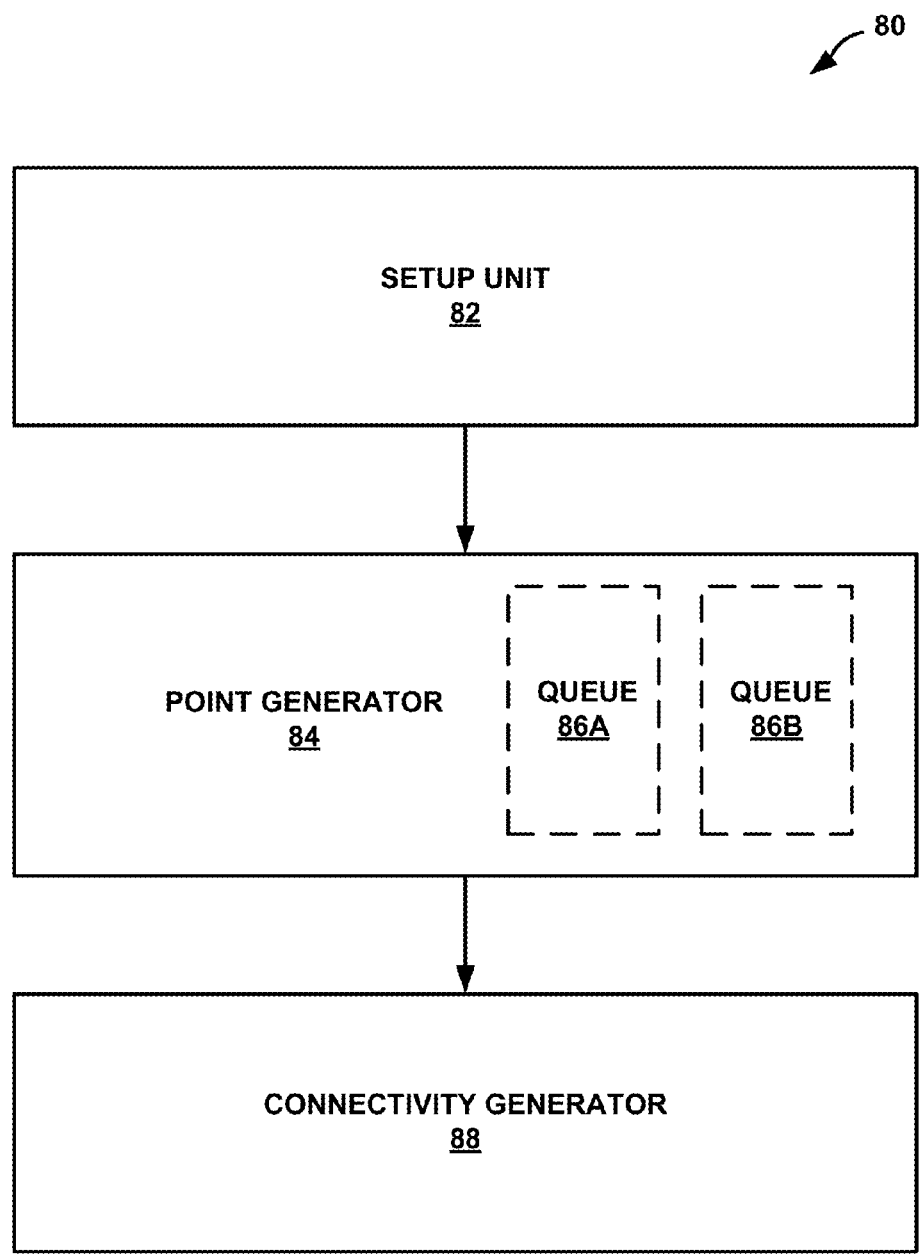
FIG. 5 is a block diagram illustrating an example of a tessellation unit in greater detail.

FIG. 5 is a block diagram illustrating an example of a tessellation unit in greater detail in accordance with one or more examples described in this disclosure. For example, FIG. 5 illustrates tessellation unit 80. Examples of tessellation unit 80 include tessellation stage 24 of FIG. 1 and primitive generator 42 of FIG. 2.

Tessellation unit 80 may include setup unit 82, point generator 84, and connectivity generator 88, which may be fixed-function hardware units of tessellation unit 80. Setup unit 82, point generator 84, and connectivity generator 88 are illustrated as separate components for ease of description. Setup unit 82, point generator 84, and connectivity generator 88 may be formed as a single unit, as separate units, or a combination thereof. Queues 86A and 86B ("queues 86") are illustrated as being within point generator 84 for ease of illustration. However, queues 86 may reside within connectivity generator 88, as separate hardware that sits between point generator 84 and connectivity generator 88 within tessellation unit 80, within the local memory of GPU 12, or system memory 14.

Setup unit 82 may receive the tessellation factors as input from a first shader unit such as hull shader stage 22 of FIG. 1 and tessellation control shader 40, and may determine the domain type from the tessellation factors. For example, if there are four tessellation factors, setup unit 82 may determine that the domain type is a triangle, and if there are six tessellation factors, setup unit 82 may determine that the domain type is a quad. Setup unit 82 may perform other setup functions such as correcting rounding problems, ceiling and floor functions, determining half tessellation factors, and reducing and combining tessellation factors. In general, setup unit 82 may process the tessellation factors to ensure that the other components of tessellation unit 80 can perform respective functions.

Point generator 84 may determine how many points reside along each edge of each ring of the domain, from the tessellation factors, and the locations of the points (e.g., the u, v coordinates or the u, v, w coordinates of the points). Based on the number of points along the outermost ring of the domain, point generator 84 may determine whether to use separate queues for the outer and inner rings during the stitching process, or whether to use a single queue to store the points of the rings, such that the points from the inner ring of a previous iteration may be reused in a subsequent stitching iteration as the points of the outer ring. Connectivity generator 88 may connect (i.e., stitch) the points to form a plurality of primitives in the domain, such as those illustrated in FIGS. 4A and 4B.

According to empirical data, in 10% of cases, the number of points on the ring inner to the outermost ring, e.g. ring 60, may be greater than 32 points. Accordingly, 90% of the time, the number of points on inner ring 60 may be less than or equal to the threshold number of points, and point generator 84 and connectivity generator 88 may utilize only a single queue to store the points that reside along inner rings 60, 61, etc. Using only the single queue may provide various advantages, as described above.

For example, point generator 84 may determine coordinates of points along an outer ring, such as outer ring 58 and outer ring 68 of FIGS. 3A and 3B, respectively, and coordinates of points along an inner ring, such as inner ring 60 and inner ring 70 of FIGS. 3A and 3B, respectively. In some examples, point generator 84 may store the determined coordinates in queues 86A and 86B. For example, queue 86A may store the coordinates of points along the inner ring edge, and queue 86B may store the coordinates of points along the outer ring edge.

As point generator 84 determines the coordinates of points, point generator 84 may store the points in one or more of queues 86. In some examples, queues 86 may be limited in size. That is, queues 86 may store no more than a certain maximum number of points. In some examples, the maximum capacity of the queue 86A may be the same as or different from the maximum capacity of queue 86B. If one of queues 86 is currently storing the maximum number of points, i.e. there is no available space in the queue, point generator 84 may not store any more points in the queue until points are removed from the queue, e.g. by connectivity generator 88, as described below.

In one example, tessellation unit 80 may store the points from the inner ring in queue 86A, and the points of an outer ring in queue 86B. If queue 86A is full, point generator 84 may not store any more points in the first queue, but may continue to generate points of the outer ring and to store the points of the outer ring in queue 86B until queue 86B is full. The reverse may also be true, i.e. if queue 86B is full, but queue 86A is not full, point generator 84 may not store points of the outer ring in queue 86B. However, point generator 84 may continue to generate points of the inner ring, and may store the points of the inner ring in queue 86A.

For each edge of the outer ring that is parallel with an edge of the inner ring, connectivity generator 88 may determine how the points of the outer ring edge should connect with the points of the inner ring edge to form primitives. For instance, there may be at least two different ways in which points along the outer ring edge and the points along the inner ring edge can form triangles. As one example, connectivity generator 88 may form a triangle using two points from the outer ring edge and one point from the inner ring edge, and connect them together to form a triangle. As another example, connectivity generator 88 may form a triangle using two points from the inner ring edge and one point from the outer ring edge to form the triangle.

Connectivity generator 88 may determine how the coordinates of the points stored in queues 86 should be utilized to form the primitives. In some examples, there may be specific, predefined ways in which connectivity generator 88 should connect the points for a given number of points along the outer ring edge and a number of points along the inner ring edge.

Based on the determination of how to connect the points stored in queues 86, and based the determination of point generator 84 of how many of queues 86 should be used, connectivity generator 88 may read points from one or more of queues 86. In one example, connectivity generator 88 may read multiple points from one queue, and a single point from the other queue. In another example, connectivity generator 88 may read inner ring and outer ring points from queues 86. In some examples, reading one or more points from queues 86 may remove the points from queues 86. In other examples, points read from queues 86 may remain in queues 86 for future reuse, for example as an outer ring point in a subsequent stitching iteration. Connectivity generator 88 may repeat these steps until connectivity generator 88 generates a predetermined number of primitives.

In this manner, connectivity generator 88 may determine how many points of the outer ring and how many points of the inner ring edge to use to generate each of the plurality of primitives. The shader unit after the tessellation unit (e.g., domain shader 26 (FIG. 1) or tessellation evaluation shader 44 (FIG. 2)) uses the resulting plurality of primitives in the domain to add primitives in the patch. The resulting patch, with the additional primitives, is then further processed through the graphics processing pipeline and ultimately rasterized to render an image.

Figure 6A:
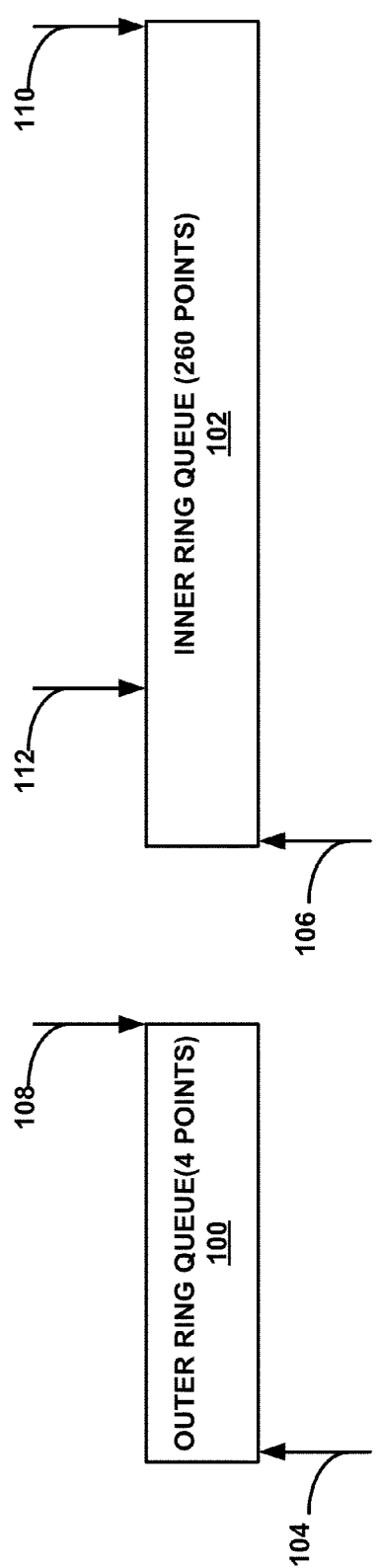
FIG. 6A is a conceptual diagram illustrating one implementation of queues for storing points of a domain.

FIG. 6A is a conceptual diagram illustrating one implementation of queues 86 (FIG. 5) for storing points of a domain. FIG. 6A illustrates two queues, outer ring queue 100, which corresponds to queue 86B, and inner ring 102, which corresponds to queue 86A. In this example, point generator 84 (FIG. 5) may use outer ring queue 100 and inner ring queue 102 to store points of the domain. As described above, the points may be comprised of coordinates, such as barycentric coordinates or Cartesian coordinates. In the example of FIG. 6A, point generator 84 may store outer ring point coordinates in outer ring queue 100, and may store inner ring point coordinates in inner ring queue 102. Connectivity generator 88 may read one or more points of the inner and outer rings from outer ring queue 100 and/or inner ring queue 102.

In some examples, outer ring queue 100 may hold a maximum of four points, and inner ring queue 102 may hold a maximum of 260 points. Inner ring queue 102 may hold 260 points so that inner ring queue 102 may hold the maximum number, 256, of points for a ring, and may still have capacity for four additional points. Although inner ring 102 queue is illustrated as having room for four additional points, inner ring queue may have room for as little as two additional points, as well as room for more than four additional points, in some examples. The room in inner ring queue 102 for four additional points may allow the maximum of two points to be read from or written to inner ring queue, while still providing additional buffer space. Each edge of a domain may have up to 64 points. For a triangle domain, there may be a maximum of 64*3=192 points that may reside on a ring. For a quad, there are four edges, meaning there is a maximum of 64*4=256 points that may reside on a ring. Thus, by having a queue of size 260 points, the maximum number of points for a ring may be stored in the queue, as well as four additional points of a subsequent ring. The maximum point storage capacities of outer ring queue 100 and inner ring queue 102 are described merely for the purposes of example, and should be considered as non-limiting examples. Different maximum capacities of points may also possible for each of outer ring queue 100 and inner ring queue 102.

If the outer ring of the domain is an outermost ring, point generator 84 may store, or enqueue the points of the outer ring in outer ring queue 100. However, if outer ring queue 100 is full, i.e. is currently storing the maximum of 4 points, point generator 84 may wait for outer ring queue 100 to have available space before enqueueing additional points in outer ring queue 100. Although outer ring queue is illustrated as having a maximum capacity of four points, outer ring queue may also store as few as two points, or a number greater than four points.

In general, point generator 84 may enqueue points at the head 104 of outer ring queue 100 or at the head 106 of inner ring queue 102. Each of outer ring queue 100 and inner ring queue 102 may keep track of the number of points in each of the queues so that connectivity generator 88 reads the first-enqueued point (i.e. the point that has been in the queue the longest) from the tail 108 of the outer ring queue 100 or the tail 110 of the inner ring queue 102. Because tail 110 of inner ring queue 102 indicates a location of the queue that contains outer ring points, tail 110 may also be referred to as an outer ring pointer.

When connectivity generator 88 reads one or more points from outer ring queue 100, the one or more points may also be removed from the queue, and more points may again be stored in outer ring queue 100. Responsive to removing one or more points from one of the outer ring queues, the tail of the queue is set to the location of the outer ring queue containing a subsequently determined point. If no points are in the outer ring queue, the location indicated by the tail may be set to the head of the queue.

Connectivity generator 88 may also read inner ring queue 102 from the location of inner ring pointer 112. Inner ring pointer 112 may generally indicate a location of inner ring queue 102 that contains the first inner ring point, which point generator 84 has enqueued, but which has not been interconnected with one or more points of an outer ring. After reading an inner ring point from inner ring pointer 112, inner ring pointer 112 may be set to the next subsequently-enqueued inner ring point, which has not been connected to one or more outer ring points. When one or more points are read from the location of inner ring pointer 112, the points are not removed from the queue. Rather, the points remain in inner ring queue 102 for later reuse as outer ring points in a subsequent stitching iteration. Also, if, after reading the one or more points from the location indicated by inner ring pointer 112, there are no more points in inner ring queue 102, the inner ring pointer may be set to the head 104 of inner ring queue 102.

In some examples, outer ring queue 100 and inner ring queue 102 may comprise first-in, first-out queues (FIFOs). A FIFO is a particular type of queue in which items are added to the head of the queue, and removed from the tail of the queue. The effect of the FIFO is that items that are enqueued first are generally the first to be removed or dequeued from the queue.

The process of stitching with respect to FIG. 6A begins with point generator 84 determining the coordinates for an outer ring. If the outer ring is an outermost ring, point generator 84 may enqueue the points of the outer ring at the head 104 of outer ring queue 100, and enqueue the inner ring points at the head 106 of inner ring queue 102. Connectivity generator 88 may read one or more points from the tail of the outer ring queue 108 and may read one or more inner ring points from the inner ring pointer 112 of inner ring queue 102. The read outer ring points are removed from outer ring queue 100 after reading the points from the tail 108 of outer ring queue 100. The inner ring points stored in inner ring queue 102 remain (i.e. are not removed), and are kept for reuse in subsequent iterations. Connectivity generator 88 may interconnect the one or more outer ring points and the one or more inner ring points.

At the beginning of a subsequent iteration, point generator 84 sets the location of the inner ring pointer 112 to the head 106 of the inner ring queue 102. The tail 110 (or outer ring pointer) is set to the first-enqueued inner ring point of inner ring queue 102. Connectivity generator 88 may read one or more inner ring points from the location of inner ring pointer 112. Connectivity generator 88 may read one or more outer ring points from the location of inner ring queue 102 indicated by tail pointer (or outer ring pointer) 110. As described above, inner ring pointer 112 is updated to a location of inner ring queue 102 containing a subsequently determined and enqueued inner ring point. Tail (outer ring) pointer 110 is updated to a location of inner ring queue 102 containing a subsequently generated and enqueued outer ring point. Any points read from tail 110 are removed from inner ring queue 102. Connectivity generator 88 may connect the points read from outer ring queue 100 and inner ring queue 102.

Figure 6B:
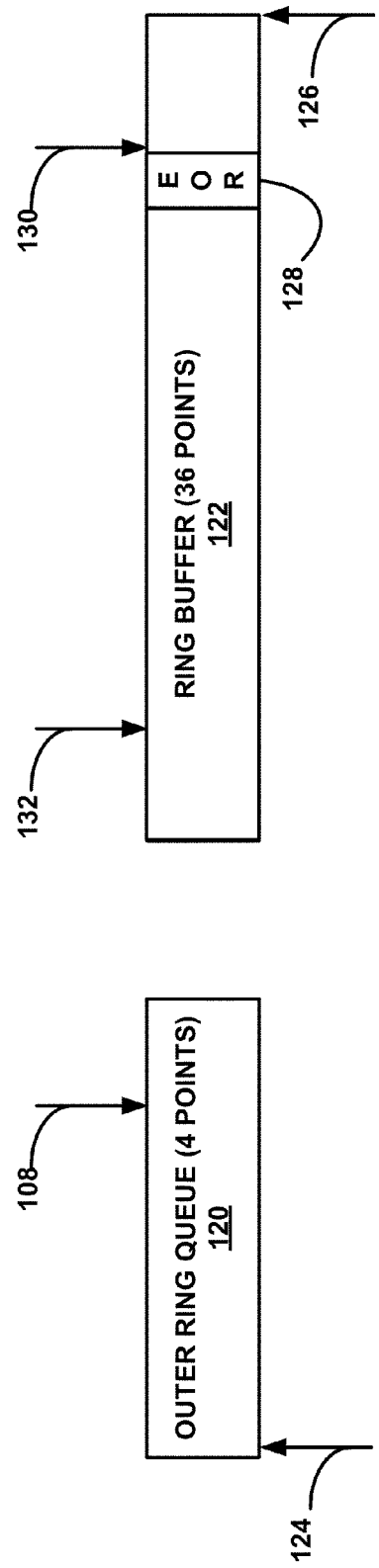
FIG. 6B is another conceptual diagram illustrating another implementation of queues for storing points of a domain.

FIG. 6B is another conceptual diagram illustrating another implementation of queues for storing points of a domain. Point generator 84 may store points of inner and outer rings in a single queue if the number of points on the ring that is inner to the outermost ring of a domain (e.g. a triangle or quad domain) is less than a threshold number of points. If the number of points on the ring that is inner to the outermost ring of the domain is greater than the threshold, ring buffer 122 may not be able to store all of the inner ring points for reuse in a subsequent stitching iteration. In some examples, the threshold value may be 32 points. That is, if the number of points that reside on the ring that is inner to the outermost ring (e.g. ring 60 of FIG. 3A) is less than or equal to 32 points, point generator 84 may utilize only ring buffer 122 to store the points that reside along the inner and outer rings. The threshold number of points, in this example 32, may be chosen in such a way that in 90% of cases, the ring that is inner to the outermost ring of the domain has 32 points or less. In this manner, pointe generator 84 and connectivity generator 88 may utilize ring buffer 122 in 90% of cases.

In the example of FIG. 6B, outer ring queue 120 may store a maximum of 4 points, and ring buffer 122 may store a maximum of 36 points. The maximum storage capacity of outer ring queue 120 and ring buffer 122 are illustrated for the purposes of example, and other maximum storage capacities may be possible for either queue. The maximum storage capacity of ring buffer 122 may be chosen such that the maximum number of points of the outermost edge of the domain does not exceed the maximum storage capacity of ring buffer 122 for a certain percentage of domains tessellated, and such that some additional storage capacity is available for storing inner ring points. In the example of FIG. 6B, ring buffer 122 may be configured to store 32 points from a previous stitching iteration for reuse in a subsequent iteration. In addition to the storage capacity used to store previously generated points, ring buffer 122 may also include four points of storage capacity for newly generated points of an inner ring.

If the number of points on the outermost ring of the domain is less than or equal to the threshold, outer ring queue 120 and ring buffer 122 may operate similarly to the implementation of outer ring queue 100 and inner ring queue 102 illustrated in FIG. 6A. Point generator 84 may enqueue, and connectivity generator 88 may read the points of the outer ring with outer ring queue 120, and the inner ring points with ring buffer 122 when the outer ring is an outer most ring (i.e. during the first stitching iteration).

During subsequent iterations (i.e. when the outer ring is not the outermost ring), ring buffer 122 stores the inner ring points for use in a subsequent stitching iteration as points of the outer ring. Ring buffer 122 may comprise a data structure that uses a single, fixed-size buffer as if it were connected end-to end. In the example of FIG. 6B, point generator 84 stores the inner ring points at a location of ring buffer 122 specified by an inner ring write pointer 126. At the beginning of each iteration, inner ring write pointer 126 begins at a location of ring buffer 122 immediately after the end of ring indicator (EOR) 128. After each point is written to ring buffer 122, the inner ring write pointer advances one location in the buffer. If the pointer reaches the end of the buffer, the pointer wraps around to the beginning of the buffer.

While point generator 84 is writing to ring buffer 122, connectivity generator 88 may read one or more inner ring points and/or outer ring points from ring buffer 122 from the locations indicated by an inner ring read pointer 130, and outer ring read pointer 132. At the beginning of each stitching iteration, inner ring read pointer 130 begins immediately after (to the right of in FIG. 6B) the EOR. When connectivity generator 88 reads an inner ring point from the location of inner ring read pointer 130, the inner ring read pointer advances (to the right in the example of FIG. 6B) to a location of a subsequently written inner ring point. Connectivity generator 88 may read inner ring points from the location of the inner ring read pointer 130 until inner ring 130 reaches the location of inner ring write pointer 126. When inner ring read pointer 130 reaches the location of inner ring write pointer 126, there may be no more inner ring points to be read from ring buffer 122, and connectivity generator 88 may not read more inner ring points from ring buffer 122.

Connectivity generator 88 may read outer ring points from the location of specified by outer ring read pointer 132. At the beginning of each stitching iteration, the outer ring read pointer 132 begins at the location of the EOR of the previous stitching iteration. After connectivity generator 88 reads an outer ring point, the outer ring read pointer advances to a subsequently enqueued outer ring point. Connectivity generator 84 may continue to read points from the location of the outer ring read pointer 132 until all outer ring points have been read, which may be indicated by the outer ring read pointer 132 pointing to the same location as the EOR 128. As detailed above, point generator 84 may write inner ring points to the location of write pointer 126. However, point generator 84 may not write points to the location of the inner ring write pointer 126 if the inner ring write pointer 126 points to the location of the outer ring read pointer 132, as any writes to ring buffer 122 would overwrite previously stored outer ring points that have not already been read.

Once connectivity generator 88 has read and connected all the points from the inner and outer rings, the EOR 128 is set to the location of ring buffer 122 immediately after inner ring write pointer 132. Point generator 84 and connectivity generator 88 may repeat the process of connecting the points of an inner ring and an outer ring until all the point of the inner and outer rings of the domain have been connected.

If the number of points on the outermost ring of the domain exceeds the threshold number of points, outer ring queue 120 and ring buffer 122 may operate similar to outer ring queue 100 and inner ring queue 102 of FIG. 6A. If the number of points on the outer most ring exceeds the threshold number of points, point generator 84 may enqueue outer ring points at head 124 of outer ring queue 120, and may enqueue inner ring points of the domain at the location of ring buffer 122 indicated by inner ring write pointer 126.

In the case where the threshold number of points is exceeded, ring buffer 122 operates as a FIFO queue. Writes to the location of the inner ring write pointer 126 are always at the head of the ring buffer, indicated by inner ring write pointer 126. Reads from ring buffer 122 always occur at the tail of the ring buffer, which is indicated by inner ring read pointer 130. For each additional point that is stored in ring buffer 122, inner ring read pointer 130 points to the location of the first-enqueue inner ring point. Inner ring write pointer 126 points to the head of the ring buffer 122. Reading one or more coordinates from the location of the inner ring read buffer 122 removes the one or more inner ring coordinates from ring buffer 122 and updates inner ring read buffer 132. No coordinates are stored for reuse in subsequent stitching iterations. Outer ring read pointer 132 is not used, and no outer ring points are stored in ring buffer 122 when the number of outermost ring coordinates exceeds the threshold number of coordinates.

After reading the outer ring and inner ring coordinates from outer ring queue 120 and ring buffer 122, connectivity generator may interconnect the points of the inner and outer rings. The process of connecting the rings may be repeated until connectivity generator 88 has connected all the points of all the inner and outer rings of the domain.

Figure 7:
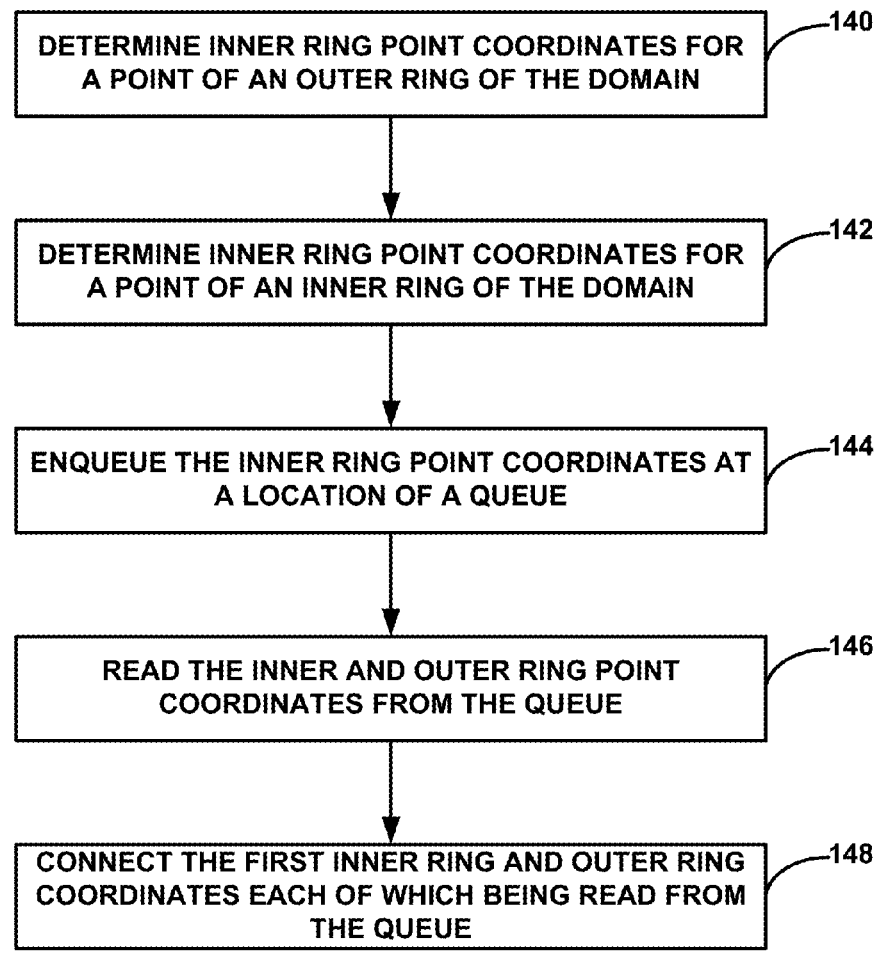
FIG. 7 is a flow chart illustrating an example operation of queues for storing points of a domain.

FIG. 7 is a flow chart illustrating an example operation of queues for enqueueing point coordinates of a domain in accordance with one or more examples described in this disclosure. For purposes of illustration only, reference is made to FIG. 5. As described above, FIG. 5 provides an example of a tessellation unit. Examples of the tessellation unit include tessellation stage 24 of FIG. 1 and primitive generator 42 of FIG. 2.

In FIG. 7, point generator 84 may be configured to determine a number of outer ring point coordinates for a point of an outer ring of the domain (140). Point generator 84 may also determine a number of inner ring point coordinates for a point of an inner ring domain (142), where the inner ring is inner to the outer ring within the domain. Point generator 84 may enqueue the inner ring point coordinates at a location of a queue, such as inner ring queue 102 (FIG. 6) (144).

Connectivity generator 88 may read the inner ring point coordinates and the outer ring point coordinates from inner ring queue 102 (146). The outer ring point coordinates may have previously been enqueued in inner ring queue 102 when the outer ring was a previous inner ring.

Connectivity generator may connect the inner ring coordinates and the outer ring coordinates read each of which being read from inner ring queue 102 (148). In some examples, outer ring queue 100 and inner ring queue 102 (FIG. 6A) may comprise first-in, first-out queues (FIFOs). In some examples, outer ring queue 100 may be configured to store a maximum of 4 point coordinates, and inner ring queue 102 may be configured to store a maximum of 260 point coordinates.

In some examples connectivity generator 88 may read the outer ring point coordinates from a location of inner ring queue 102 indicated by an outer ring pointer. Connectivity generator 88 may read the inner ring point coordinates from a location of the queue indicated by an inner ring pointer.

In some examples, the inner ring point coordinates may comprise first inner ring point coordinates, and the location of inner ring queue 102 indicated by the inner ring pointer may comprise a first location of the queue, inner ring queue 102. Point generator 84 may set the inner ring pointer to a second location of inner ring queue 102 that contains second inner ring pointer coordinates after connectivity generator 88 reads the first inner ring point coordinates form the first location of inner ring queue 102 indicated by the inner ring pointer. Connectivity generator 88 may read the second point coordinates from the second location of inner ring 102 indicated by the inner ring pointer.

Connectivity generator 88 may read all the outer ring point coordinates from inner ring queue 102. After connectivity generator 88 reads all the outer ring point coordinates, point generator 84 may set the outer ring point to the location of inner ring queue 102 that contains the inner ring point coordinates. In some examples, all of the inner ring coordinates and the outer ring coordinates may be stored in inner ring queue 102.

When the outer ring is an outermost ring: inner ring queue 102 may comprise a first queue; the location of inner ring queue 102 may comprise a first location of the first queue; point generator 84 may enqueue the first outer ring point coordinates at a second location of a second queue, such as outer ring queue 100; and connectivity generator 88 may read the first outer ring point coordinates from a second location of a second queue. To connect the first inner ring coordinates and the second ring coordinates, connectivity generator 84 may connect the first inner ring coordinates from the first location of inner ring queue 102 and the first outer ring coordinates from the second location of outer ring queue 100.

In some examples, connectivity generator 88 may read the outer ring point coordinates from outer ring queue 100 when the outer ring is an outermost ring by removing the outer ring point coordinates from outer ring queue 100 when the outer ring is an outermost ring. To read the inner ring point coordinates from the first queue when the outer ring is an outermost ring, connectivity generator 88 may remove the inner ring point coordinates from inner ring queue 102 when the outer ring is an outermost ring.

Figure 8:
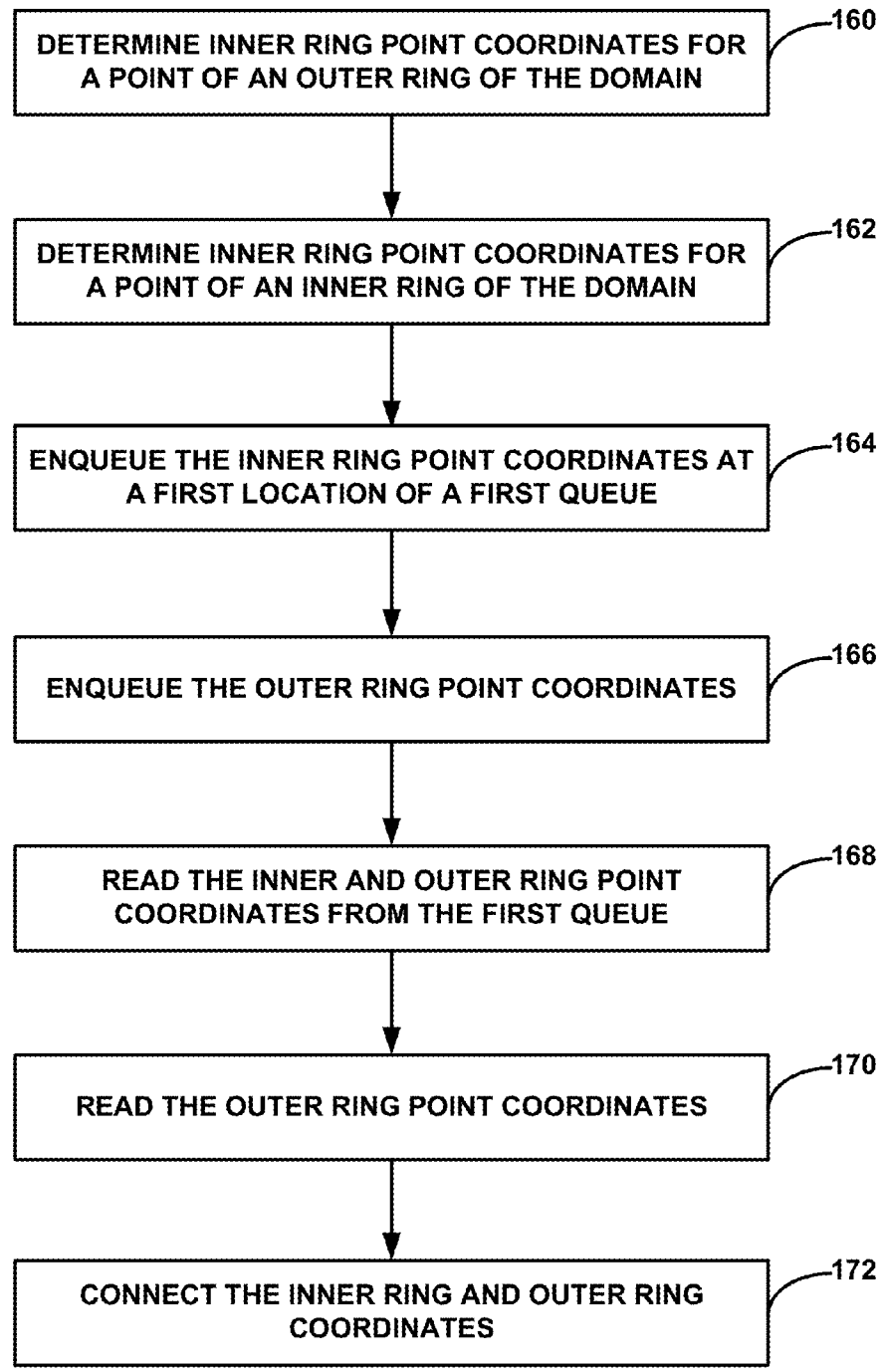
FIG. 8 is a flow chart illustrating an example operation of queues for storing points of a domain.

FIG. 8 is a flow chart illustrating an example operation of queues for storing points of a domain in accordance with one or more examples described in this disclosure. For purposes of illustration only, reference is made to FIG. 5. As described above, FIG. 5 provides an example of a tessellation unit. Examples of the tessellation unit include tessellation stage 24 of FIG. 1 and primitive generator 42 of FIG. 2.

In FIG. 5, point generator 84 may be configured to determine a number of outer ring point coordinates for a point of an outer ring of the domain (160). Point generator 84 may also determine a number of inner ring point coordinates for a point of an inner ring domain (162), where the inner ring is inner to the outer ring within the domain.

Point generator 84 may enqueue the inner ring point coordinates at a first location of a first queue, such as ring buffer 122 (FIG. 6A) (164). Point generator 84 may enqueue the outer ring point coordinates at a second location of a second queue, such as outer ring queue 120 (FIG. 6B) when the outer ring is not the outermost ring and when a number of points along the outermost ring is less than or equal to a threshold (166). Ring buffer 122 may comprise a first queue, and point generator may 84 may enqueue the outer ring point coordinates at a first location of a second queue, such as outer ring queue 120 (FIG. 6B) when the outer ring is the outermost ring or when the number of points along the outermost ring is greater than a threshold (166).

Connectivity generator 88 may read the inner ring point coordinates from the first location of the first queue, ring buffer 122 (168). Connectivity generator 88 may read the outer ring point coordinates from the second location of the first queue, ring buffer 122, when the outer ring is not the outermost ring, and when the number of points along the outer most ring is less than or equal to the threshold (170). Connectivity generator 88 may read the outer ring point coordinates from the first location of the first queue, outer queue 120, when the outer ring is not the outermost ring, and when the number of points along the outer most ring is less than or equal to the threshold (170). Connectivity generator 88 may connect the inner ring point coordinates and the outer ring point coordinates (172).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating points of a domain, the method comprising:
   determining, with a tessellation unit, outer ring point coordinates for a point of an outer ring of the domain based on a tessellation factor received from a hull shader, wherein the outer ring point coordinates comprise at least u and v outer ring point coordinates;

determining, with the tessellation unit, inner ring point coordinates for a point of an inner ring of the domain based on the tessellation factor received from the hull shader, wherein the inner ring point coordinates comprise at least u and v inner ring point coordinates, wherein the inner ring is inner to the outer ring within the domain;

enqueueing, with the tessellation unit, the inner ring point coordinates at a location of a queue;

reading, with the tessellation unit, the inner ring point coordinates from the queue, wherein reading the inner ring point coordinates comprises reading the at least u and v inner ring point coordinates corresponding to the point of the inner ring;

reading, with the tessellation unit, the outer ring point coordinates from the queue when the outer ring is not an outermost ring, wherein the outer ring point coordinates were previously enqueued in the queue when the outer ring was a previous inner ring, and wherein reading the outer ring point coordinates comprises reading the at least u and v outer ring point coordinates; and connecting, with the tessellation unit, the inner ring coordinates and the outer ring coordinates each of which being read from the queue.

2. The method of claim 1, wherein determining the outer ring point coordinates comprises determining, with a point generator of the tessellation unit, wherein determining the inner ring point coordinates comprises determining, with the point generator of the tessellation unit, and wherein enqueueing comprises enqueueing, with the point generator of the tessellation unit.

3. The method of claim 1, wherein reading the inner ring point coordinates comprises reading, with a connectivity generator of the tessellation unit, wherein reading the outer point coordinates comprises reading, with the connectivity generator of the tessellation unit, and wherein connecting the inner ring point coordinates and the outer ring point coordinates comprises connecting, with the connectivity generator of the tessellation unit, the inner ring coordinates and the outer ring coordinates.

4. The method of claim 1, wherein the queue comprises a first-in, first-out queue (FIFO).

5. The method of claim 1, wherein the queue comprises a first queue, the method further comprising:
enqueueing, with tessellation unit, the outer ring point coordinates in a first location of a second queue when the outer ring is the outermost ring.

6. The method of claim 1, wherein the queue is configured to store a maximum of 260 point coordinates.

7. The method of claim 1,
wherein reading the outer ring point coordinates from the queue comprises reading, with the tessellation unit, the outer ring point coordinates from a location of the queue indicated by an outer ring pointer, and wherein reading the inner ring point coordinates from the queue comprises reading, with the tessellation unit, the inner ring point coordinates from a location of the queue indicated by an inner ring pointer.

8. The method of claim 7,
wherein the inner ring point coordinates comprise first inner ring point coordinates, and wherein the location of the queue indicated by the inner ring pointer comprises a first location of the queue, the method further comprising:
setting, with the tessellation unit, the inner ring pointer to a second location of the queue that contains second inner ring point coordinates that were determined subsequent to the first inner ring point coordinates, after reading, with the tessellation unit, the first inner ring point coordinates from the first location of the queue indicated by the inner ring pointer.

9. The method of claim 8, the method further comprising:
reading, with the tessellation unit, the second point coordinates from the second location of the queue indicated by the inner ring pointer.

10. The method of claim 7, the method further comprising:
reading, with the tessellation unit, all point coordinates of the outer ring from the queue; and
setting, with the tessellation unit, the outer ring pointer to the location of the queue that contains the inner ring point coordinates after reading all point coordinates of the outer ring from the queue.

11. The method of claim 1, wherein the inner ring point coordinates and the outer ring point coordinates are stored in the same queue.

12. The method of claim 1,
when the outer ring is the outermost ring:
wherein the queue comprises a first queue, wherein the location of the queue comprises a first location of the first queue, the method further comprising:
enqueueing, with the tessellation unit, the first outer ring point coordinates at a second location of a second queue; and
reading, with the tessellation unit, the first outer ring point coordinates from the second location of the second queue;
wherein connecting the first inner ring coordinates and the second ring coordinates comprises connecting, with the tessellation unit, the first inner ring coordinates from the first location of the first queue and the first outer ring coordinates from the second location of the second queue.

13. The method of claim 12, wherein the second queue is configured to store a maximum of four point coordinates.

14. The method of claim 12,
wherein reading the outer ring point coordinates from the second queue when the outer ring is an outermost ring comprises removing the outer ring point coordinates from the second queue when the outer ring is an outermost ring, and wherein reading the inner ring point coordinates from the first queue when the outer ring is an outermost ring comprises removing the inner ring point coordinates from the first queue when the outer ring is an outermost ring.

15. The method of claim 11, wherein the second queue comprises a FIFO.

16. A method of generating points for a domain, the method comprising:
determining, with tessellation unit, outer ring point coordinates for a point of an outer ring of the domain based on a tessellation factor received from a hull shader;
determining, with the tessellation unit, inner ring point coordinates for a point of an inner ring of the domain based on the tessellation factor received from the hull shader, wherein the inner ring is inner to the outer ring within the domain;
enqueueing, with a point generator, the inner ring point coordinates at a first location of a first queue;
enqueueing, with the tessellation unit, the outer ring point coordinates in a second location of the first queue when the outer ring is not the outermost ring and when a number of points along the outermost ring is less than or equal to a threshold;

enqueueing, with the tessellation unit, the outer ring point coordinates in a first location of a second queue when the outer ring is the outermost ring or when the number of points along the outermost ring is greater than the threshold;

reading, with the tessellation unit, the inner ring point coordinates from the first location of the first queue;

reading, with the tessellation unit, the outer ring point coordinates from the second location of the first queue when the outer ring is not the outermost ring and when the number of points along the outermost ring is less than or equal to the threshold;

reading, with the tessellation unit, the outer ring point coordinates from the first location of the second queue when the outer ring is the outermost ring or when the number of points along the outermost edge is greater than the threshold; and connecting, with the tessellation unit, the inner ring point coordinates and the outer ring point coordinates.

17. A device comprising:
at least one processor;
a queue; and
a tessellation unit configured to:
determine first outer ring point coordinates for a first point of an outer ring of the domain based on a tessellation factor received from a hull shader, wherein the outer ring point coordinates comprise at least u and v outer ring point coordinates;
determine first inner ring point coordinates for a first point of an inner ring of the domain, wherein the inner ring is inner to the outer ring within the domain based on the tessellation factor received from the hull shader, wherein the inner ring point coordinates comprise at least u and v inner ring point coordinates;
enqueue the first inner ring point coordinates at a first location of a queue;
read the first inner ring point coordinates from the queue, wherein to read the inner ring point coordinates, the tessellation unit is configured to read the at least u and v inner ring point coordinates corresponding to the first point of the inner ring;
read the first outer ring point coordinates from the queue when the outer ring is not an outermost ring, wherein the first outer ring point coordinates were previously enqueued in the queue when the outer ring was a previous inner ring, and wherein to read the outer ring point coordinates, the tessellation unit is configured to read the at least u and v outer ring point coordinates; and
connect the first inner ring coordinates and the first outer ring coordinates each of which being read from the queue.

18. The device of claim 17, wherein the queue comprises a first-in, first-out queue (FIFO).

19. The device of claim 17, wherein the tessellation unit is further configured to:
enqueue, with tessellation unit, the outer ring point coordinates in a first location of a second queue when the outer ring is the outermost ring.

20. The device of claim 17, wherein the queue is configured to store a maximum of 260 point coordinates.

21. The device of claim 17,
wherein to read the outer ring point coordinates from the queue, the tessellation unit is configured to read the outer ring point coordinates from a location of the queue indicated by an outer ring pointer, and wherein to read the inner ring point coordinates from the queue the tessellation unit is configured to read the inner ring point coordinates from a location of the queue indicated by an inner ring pointer.

22. The device of claim 21,
wherein the inner ring point coordinates comprise first inner ring point coordinates, and wherein the location of the queue indicated by the inner ring pointer comprises a first location of the queue, and wherein the tessellation unit is further configured to:
set the inner ring pointer to a second location of the queue that contains second inner ring point coordinates that were determined subsequent to the first inner ring point coordinates, after reading the first inner ring point coordinates from the first location of the queue indicated by the inner ring pointer.

23. The device of claim 22, wherein the tessellation unit is further configured to:
read the second point coordinates from the second location of the queue indicated by the inner ring pointer.

24. The device of claim 21, wherein the tessellation unit is further configured to:
read all point coordinates of the outer ring from the queue; and
set the outer ring pointer to the location of the queue that contains the inner ring point coordinates after reading all point coordinates of the outer ring from the queue.

25. The device of claim 21, wherein the inner ring point coordinates and the outer ring point coordinates are stored in the same queue.

26. The device of claim 21,
when the outer ring is the outermost ring:
wherein the queue comprises a first queue, wherein the location of the queue comprises a first location of the first queue,
wherein the tessellation unit is configured to enqueue, with the tessellation unit, the first outer ring point coordinates at a second location of a second queue; and
read the first outer ring point coordinates from a second location of a second queue;
wherein to connect the first inner ring coordinates and the second ring coordinates, the tessellation unit is configured to connect the first inner ring coordinates from the first location of the first queue and the first outer ring coordinates from the second location of the second queue.

27. The device of claim 26, wherein the second queue is configured to store a maximum of four point coordinates.

28. The device of claim 26,
wherein to read the outer ring point coordinates from the second queue when the outer ring is an outermost ring, the tessellation unit is configured to remove the outer ring point coordinates from the second queue when the outer ring is an outermost ring, and wherein to read the inner ring point coordinates from the first queue when the outer ring is an outermost ring the tessellation unit is configured to remove the inner ring point coordinates from the first queue when the outer ring is an outermost ring.

29. The device of claim 19, wherein the second queue comprises a FIFO.

30. A tessellation unit comprising:
a point generator implemented on computer graphics hardware configured to:
determine first outer ring point coordinates for a first point of an outer ring of the domain based on a tessellation factor received from a hull shader, wherein the outer ring point coordinates comprise at least u and v outer ring point coordinates;

determine first inner ring point coordinates for a first point of an inner ring of the domain based on the tessellation factor received from the hull shader, wherein the inner ring point coordinates comprise at least u and v inner ring point coordinates, wherein the inner ring is inner to the outer ring within the domain;

enqueue the first inner ring point coordinates at a first location of a queue; and a connectivity generator configured to:

read the first inner ring point coordinates from the queue, wherein to read the inner ring point coordinates, the point generator is configured to read the at least u and v inner ring point coordinates corresponding to the first point of the inner ring;

read the first outer ring point coordinates from the queue when the outer ring is not an outermost ring, wherein the first outer ring point coordinates were previously enqueued in the queue when the outer ring was a previous inner ring, wherein to read the outer ring point coordinates, the point generator is configured to read the at least u and v outer ring point coordinates; and connect the first inner ring coordinates and the first outer ring coordinates each of which being read from the queue.

31. The tessellation unit of claim 30, wherein the point generator is further configured to:

enqueue, with tessellation unit, the outer ring point coordinates in a first location of a second queue when the outer ring is the outermost ring.

32. The tessellation unit of claim 30, wherein to read the outer ring point coordinates from the queue, the tessellation unit is configured to read the outer ring point coordinates from a location of the queue indicated by an outer ring pointer, and wherein to read the inner ring point coordinates from the queue the tessellation unit is configured to read the inner ring point coordinates from a location of the queue indicated by an inner ring pointer.

33. The tessellation unit of claim 32, wherein the inner ring point coordinates comprise first inner ring point coordinates, and wherein the location of the queue indicated by the inner ring pointer comprises a first location of the queue, and wherein the tessellation unit is further configured to:

set the inner ring pointer to a second location of the queue that contains second inner ring point coordinates that were determined subsequent to the first inner ring point coordinates, after reading the first inner ring point coordinates from the first location of the queue indicated by the inner ring pointer.

34. The tessellation unit of claim 33, wherein the tessellation unit is further configured to:

read the second point coordinates from the second location of the queue indicated by the inner ring pointer.

35. The tessellation unit of claim 32, wherein the tessellation unit is further configured to:

read all point coordinates of the outer ring from the queue; and set the outer ring pointer to the location of the queue that contains the inner ring point coordinates after reading all point coordinates of the outer ring from the queue.

36. The tessellation unit of claim 32, wherein the inner ring point coordinates and the outer ring point coordinates are stored in the same queue.

37. The tessellation unit of claim 30, when the outer ring is the outermost ring:

wherein the queue comprises a first queue, wherein the location of the queue comprises a first location of the first queue, wherein the tessellation unit is configured to enqueue, with the tessellation unit, the first outer ring point coordinates at a second location of a second queue; and read the first outer ring point coordinates from a second location of a second queue;

wherein to connect the first inner ring coordinates and the second ring coordinates, the tessellation unit is configured to connect the first inner ring coordinates from the first location of the first queue and the first outer ring coordinates from the second location of the second queue.

38. The tessellation unit of claim 37, wherein to read the outer ring point coordinates from the second queue when the outer ring is an outermost ring, the tessellation unit is configured to remove the outer ring point coordinates from the second queue when the outer ring is an outermost ring, and wherein to read the inner ring point coordinates from the first queue when the outer ring is an outermost ring the tessellation unit is configured to remove the inner ring point coordinates from the first queue when the outer ring is an outermost ring.

39. A tessellation unit comprising:

means for determining first outer ring point coordinates for a first point of an outer ring of the domain based on a tessellation factor received from a hull shader, wherein the outer ring point coordinates comprise at least u and v outer ring point coordinates;

means for determining first inner ring point coordinates for a first point of an inner ring of the domain, wherein the inner ring is inner to the outer ring within the domain based on the tessellation factor received from the hull shader, wherein the inner ring point coordinates comprise at least u and v inner ring point coordinates;

means for enqueueing the first inner ring point coordinates at a first location of a queue; and means for reading the first inner ring point coordinates from the queue, wherein the means for reading the inner ring point coordinates comprises means for reading the at least u and v inner ring point coordinates corresponding to the first point of the inner ring;

means for reading the first outer ring point coordinates from the queue when the outer ring is not an outermost ring, wherein the first outer ring point coordinates were previously enqueued in the queue when the outer ring was a previous inner ring, and wherein the means for reading the outer ring point coordinates comprises means for reading the at least u and v outer ring point coordinates; and means for connecting the first inner ring coordinates and the first outer ring coordinates each of which being read from the queue.

40. A non-transitory computer-readable storage medium including instructions stored thereon that when executed cause one or more processors to:

determine first outer ring point coordinates for a first point of an outer ring of the domain based on a tessellation factor received from a hull shader, wherein the outer ring point coordinates comprise at least u and v outer ring point coordinates;

determine first inner ring point coordinates for a first point of an inner ring of the domain based on the tessellation factor received from the hull shader, wherein the inner ring point coordinates comprise at least u an v inner ring point coordinates, wherein the inner ring is inner to the outer ring within the domain;

enqueue the first inner ring point coordinates at a first location of a queue;

read the first inner ring point coordinates from the queue, wherein to read the inner ring point coordinates, the one or more processors are configured to read the at least u and v inner ring point coordinates corresponding to the first point of the inner ring;

read the first outer ring point coordinates from the queue when the outer ring is not an outermost ring, wherein the first outer ring point coordinates were previously enqueued in the queue when the outer ring was a previous inner ring, and wherein to read the outer ring point coordinates, the one or more processors are configured to read the at least u and v outer ring point coordinates; and connect the first inner ring coordinates and the first outer ring coordinates each of which being read from the queue.

* * * * *